US012606423B2

(12) United States Patent
Harms et al.

(10) Patent No.: US 12,606,423 B2
(45) Date of Patent: Apr. 21, 2026

(54) TOP-LOADING TOWER CRANE SYSTEMS AND ASSOCIATED METHODS

(71) Applicant: National Oilwell Varco, L.P., Houston, TX (US)

(72) Inventors: Anthony Jason Harms, Hockley, TX (US); Travis Miller, Houston, TX (US); Robert Benjamin Donnally, Houston, TX (US)

(73) Assignee: National Oilwell Varco, L.P., Houston, TX (US)

(*) Notice: Subject to any disclaimer, the term of this patent is extended or adjusted under 35 U.S.C. 154(b) by 365 days.

(21) Appl. No.: 18/131,653

(22) Filed: Apr. 6, 2023

(65) Prior Publication Data

US 2023/0322529 A1 Oct. 12, 2023

Related U.S. Application Data

(60) Provisional application No. 63/328,359, filed on Apr. 7, 2022.

(51) Int. Cl.

*B66C 23/28* (2006.01)
*B66C 23/34* (2006.01)
*B66C 23/18* (2006.01)
*B66C 23/20* (2006.01)

(52) U.S. Cl.

CPC .............. *B66C 23/28* (2013.01); *B66C 23/34* (2013.01); *B66C 23/185* (2013.01); *B66C 23/207* (2013.01)

(58) Field of Classification Search

CPC .................... B66C 23/28; B66C 23/34; B66C 23/283–305

See application file for complete search history.

(56) References Cited

U.S. PATENT DOCUMENTS

2020/0102193 A1* 4/2020 Strandberg ............ B66C 23/185
2022/0194753 A1* 6/2022 Harms ...................... B66C 9/00

FOREIGN PATENT DOCUMENTS

DE 2206984 A1 * 9/1973 ............. B66C 23/84

* cited by examiner

*Primary Examiner* — Anna M Momper
*Assistant Examiner* — Nathaniel L Adams
(74) *Attorney, Agent, or Firm* — Conley Rose, P.C.

(57) ABSTRACT

A tower crane for performing a lifting a load includes an extendable tower assembly having a central axis and including a plurality of separate tower sections, a climbing assembly including a climbing frame positioned on the tower assembly and a latching assembly to transport the climbing assembly vertically along the tower assembly, and a boom assembly atop the tower assembly and including a crane floor, a boom supported on the crane floor, a lifting member coupled to the boom, and a slew bearing coupled to the crane floor and configured to permit the crane floor to rotate about a rotational axis, wherein the slew bearing includes a first bearing position and a second bearing position spaced from the first bearing position relative to the central axis of the tower assembly.

19 Claims, 16 Drawing Sheets

TOP-LOADING TOWER CRANE SYSTEMS AND ASSOCIATED METHODS

CROSS-REFERENCE TO RELATED APPLICATIONS

The present application claims benefit of U.S. provisional patent application No. 63/328,359 filed Apr. 7, 2022, entitled "Top-Loading Tower Crane System and Associated Methods", which is incorporated herein in its entirety for all purposes.

STATEMENT REGARDING FEDERALLY SPONSORED RESEARCH OR DEVELOPMENT

Not applicable.

BACKGROUND

Tower cranes are utilized in a variety of applications for lifting equipment several hundred feet vertically in the air in some instances. As an example, tower cranes are utilized in the construction of wind turbines (also sometimes referred to as "windmills") generally configured to convert wind into electrical energy. Wind turbines typically include a tapered turbine tower and a wind turbine nacelle positioned atop the turbine tower. Tower cranes typically include a support base positioned at the ground, a tower extending vertically upwards from the base, a jib or boom assembly located atop the base and used to vertically lift the equipment manipulated by the tower crane, and a slewing unit connected between the tower and the jib to permit the jib to rotate about a vertical axis relative to the tower unit so that the jib can reach different pieces of equipment located at different positions about the base.

SUMMARY

An embodiment of a tower crane for performing a lifting a load, the tower crane comprises an extendable tower assembly having a central axis and comprising a plurality of separate tower sections, a climbing assembly comprising a climbing frame positioned on the tower assembly and a latching assembly to transport the climbing assembly vertically along the tower assembly, and a boom assembly atop the tower assembly and comprising a crane floor, a boom supported on the crane floor, a lifting member coupled to the boom, and a slew bearing coupled to the crane floor and configured to permit the crane floor to rotate about a rotational axis, and wherein the slew bearing comprises a first bearing position and a second bearing position spaced from the first bearing position relative to the central axis of the tower assembly. In some embodiments, the rotational axis is aligned with the central axis of the tower assembly when the slew bearing is in the first bearing position, and wherein the rotational axis is laterally spaced from the central axis of the tower assembly when the slew bearing is in the second bearing position. In some embodiments, the slew bearing comprises an upper support connected to the crane floor, an annular first bearing race connected to the upper support, a lower support connected to the tower assembly hen the slew bearing is in the first bearing position, and an annular second bearing race connected to the lower support and rotatable about the rotational axis relative to the first bearing race. In certain embodiments, the lower support of the slew bearing is disconnected from the tower assembly when the slew bearing is in the second bearing position. In certain embodiments, a lower end of the crane floor is attached to the climbing frame of the climbing assembly when the slew bearing is in the second bearing position. In some embodiments, the climbing frame comprises a floor support on which the crane floor and the slew bearing are positioned, and with the boom assembly positioned atop the tower assembly, the crane floor comprises a first floor position and a second floor position spaced from the first floor position relative to the central axis of the tower assembly. In some embodiments, the crane floor is rotatable about the rotational axis when the crane floor is in both the first floor position and the second floor position. In certain embodiments, the boom assembly comprises a slew bearing transport assembly supported on the crane floor and configured to transport the slew bearing between the first bearing position and the second bearing position. In certain embodiments, the tower crane comprising an extendable tower assembly having a central axis and comprising a plurality of separate tower sections, a climbing assembly comprising a climbing frame positioned on the tower assembly and a latching assembly to transport the climbing assembly vertically along the tower assembly, and a boom assembly positioned atop the tower assembly and comprising a crane floor, a boom supported on the crane floor, a lifting member coupled to the boom, a slew bearing coupled to the crane floor and configured to permit the crane floor to rotate about a rotational axis, and a slew bearing transport assembly supported on the crane floor and configured to transport the slew bearing between a first bearing position and a second bearing position that is spaced from the first bearing position. In some embodiments, slew bearing transport assembly comprises a transport frame transportable along the crane floor, a transport actuator connected between the transport frame and the slew bearing, and a latching actuator configured to selectably lock the transport frame to the crane floor. In some embodiments, the transport assembly comprises a slew latch comprising a locked position received in a notch formed in the crane floor preventing relative lateral movement between the transport frame and the crane floor, and an unlocked position retracted from the notch and permitting relative lateral movement between the transport frame and the crane floor. In certain embodiments, the transport actuator is configured to displace the slew bearing laterally relative to the central axis of the tower assembly in response to actuating the transport actuator between an extended configuration and a retracted configuration. In certain embodiments, the rotational axis is aligned with the central axis of the tower assembly when the slew bearing is in the first bearing position, and wherein the rotational axis is spaced from the central axis of the tower assembly when the slew bearing is in the second bearing position. In some embodiments, the climbing frame comprises a floor support on which the crane floor and the slew bearing are positioned, and with the boom assembly positioned atop the tower assembly, the crane floor comprises a first floor position and a second floor position spaced from the first floor position relative to the central axis of the tower assembly. In certain embodiments, the slew bearing comprises an upper support connected to the crane floor, an annular first bearing race connected to the supper support, a lower support connected to the tower assembly hen the slew bearing is in the first bearing position, and an annular second bearing race connected to the lower support and rotatable about the rotational axis relative to the first bearing race. In certain embodiments, the lower support of the slew bearing is disconnected from the tower assembly when the slew bearing is in the second bearing position.

An embodiment of a method for lifting a load using a tower crane comprises (a) positioning a boom assembly of the tower crane atop a tower assembly of the tower crane, (b) transporting a slew bearing of the boom assembly from a first bearing position to a second bearing position that is spaced from the first bearing position, wherein a tower opening is formed exposing an upper end of the tower assembly when the slew bearing is in the second bearing position, (c) lifting by a boom of the tower crane a tower section to be added to the tower assembly of the tower crane, (d) vertically lowering by the boom the tower section through the tower opening and landing the tower section onto an upper end of the tower assembly, and (e) connecting the tower section to the upper end of the tower assembly to add the tower section to the tower assembly. In some embodiments, (a) comprises actuating a transport assembly connected between the slew bearing and a crane floor of the tower crane to transport the slew bearing between the first bearing position and the second bearing position. In some embodiments, (b) comprises (b1) actuating a slew latch of the transport assembly from an unlocked position to a locked position received in a notch formed in the crane floor, and (b2) actuating a transport actuator of the transport assembly to displace the slew bearing laterally along the crane floor with the slew latch in the locked position. In certain embodiments, the method comprises (f) transporting a crane floor of the tower crane from a first floor position to a second floor position, wherein a tower opening is formed exposing an upper end of the tower assembly when the slew bearing is in the second bearing position.

BRIEF DESCRIPTION OF THE DRAWINGS

For a detailed description of exemplary embodiments of the disclosure, reference will now be made to the accompanying drawings in which.

DETAILED DESCRIPTION

Figure 1:
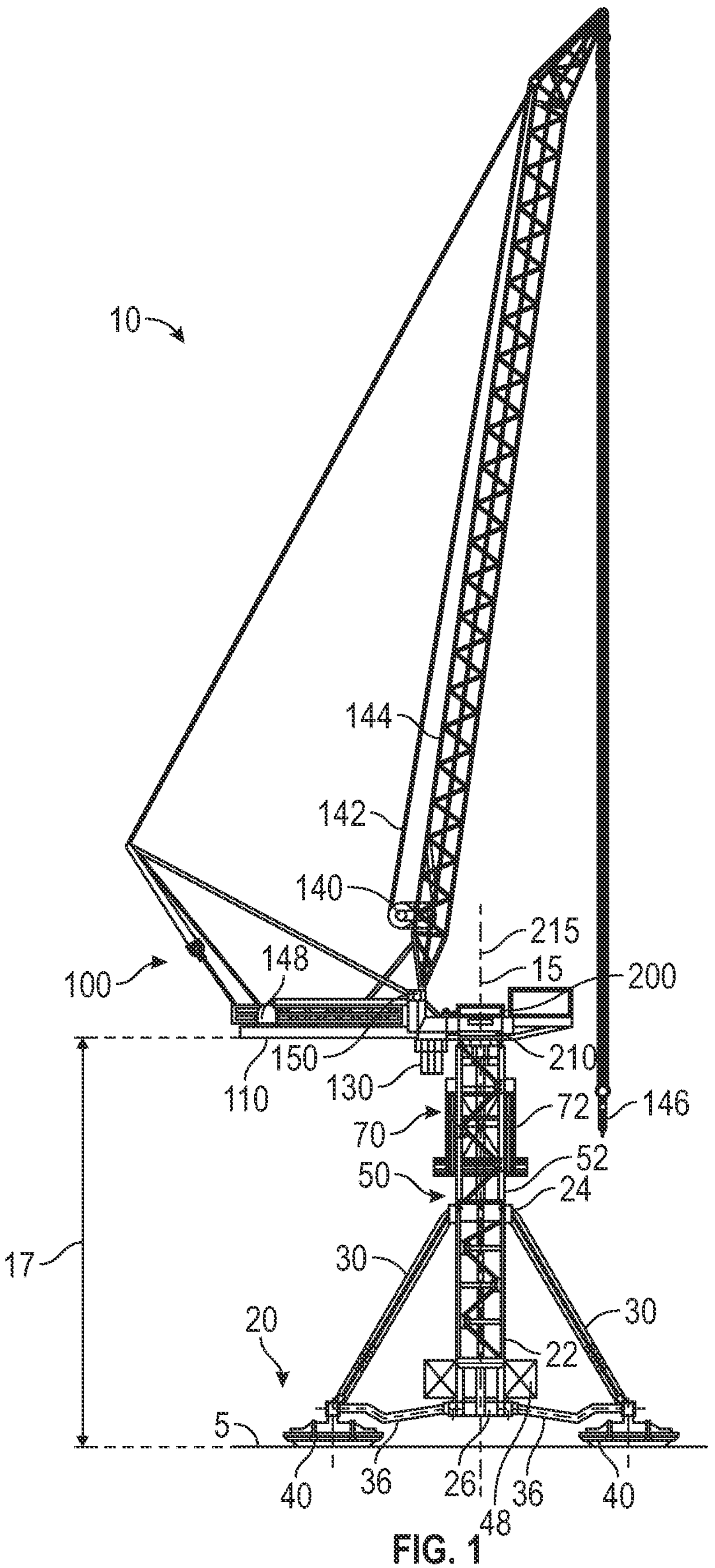
FIGS. 1-5 are front views of an embodiment of a tower crane.

The following discussion is directed to various exemplary embodiments. However, one skilled in the art will understand that the examples disclosed have broad application. The discussion of any embodiment is meant only to be exemplary of that embodiment and is not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components may be shown exaggerated in scale or in somewhat schematic form. Some details of conventional elements may not be shown in interest of clarity and conciseness.

In the following discussion and in the claims, the terms "including" and "comprising" are used in an open-ended fashion and thus should be interpreted to mean "including, but not limited to". Also, the term "couple" or "couples" is intended to mean either an indirect or direct connection. Thus, if a first device couples to a second device, that connection may be either through a direct connection or through an indirect connection via another device, component, or connection. The terms "axial" and "axially" generally mean along or parallel to a central axis, such as a central axis of a body or a port. The terms "radial" and "radially" generally mean perpendicular to a central axis. For comparison, an axial distance refers to a distance measured along or parallel to the central axis, and a radial distance means a distance measured perpendicular to the central axis.

As previously described, tower cranes vertically lift equipment as part of a lifting operation for a variety of purposes, including constructing a wind turbine. A wind turbine may include a wind tower and a nacelle positioned atop the wind turbine that houses a generator and a drivetrain of the wind turbine. Also, as previously described, tower cranes typically include a support base, a tower extending from the support base, and a boom assembly positioned atop the tower to lift the equipment manipulated by the tower crane. The tower of the tower crane typically includes a plurality of separate tower sections that are connected end-to-end. The vertical length of the tower may be extended during the operation of the tower crane to adjust a vertical height of the boom assembly relative to the ground upon which the tower crane is positioned. For example, when assembling a wind turbine, the vertical length of the tower is extended as the tower of the wind turbine is assembled. Specifically, during the assembly of the wind turbine, the tower crane may repeatedly lift from the ground and lower onto the wind turbine tower one or more wind turbine tower sections. The vertical length of the tower of the tower crane may be repeatedly extended during the assembly of the wind turbine tower such that the boom assembly of the tower crane remains at a greater vertical height than the vertical height of a vertically upper end of the wind turbine tower.

Conventionally, the tower of the tower crane is extended by jacking a crane floor of the boom assembly vertically upwards from a vertically upper end of the tower using a climbing assembly connected between the crane floor and the tower, thereby forming an opening between the crane floor and the vertically upper end of the tower. Conventional tower cranes of this nature may be referred to as "side-loading" tower cranes given that each tower section is loaded through a side of the tower crane. Additionally, the boom assembly lifts a tower section to a vertical height proximal but below the vertical height of a crane floor of the boom assembly of the tower crane. In this position, the lifted tower section is inserted by the boom assembly into the opening formed between the vertically upper end of the tower and the crane floor. Once inserted into the opening, the lifted tower section is attached to the vertically upper end of the tower and the crane floor is lowered by the climbing assembly onto the added tower section, which extends the vertical length of the tower by the length of the added tower section. In this example, this process of extending the vertical length of the tower of the tower crane is repeated as the tower crane assembles the wind turbine until the tower crane lifts and positions the nacelle atop the completed wind turbine tower.

Conventional tower cranes typically only add a single tower section at a time to the tower of the tower crane. Conventional tower cranes load additional tower sections through an opening formed between the crane floor and the tower via the climbing assembly of the tower crane. For example, a first tower section may be lifted and added to the tower via an initial opening formed between the crane floor and the tower, followed by a second tower section once the climbing frame has climbed the first added tower section to form a new opening between the crane floor and the tower. This process of repeatedly adding single tower sections undesirably increases the amount of time required to extend the vertical length of the tower of the tower crane. In-turn, this also undesirably increases the amount of time required to perform a lifting operation, such as assembling a wind turbine.

Additionally, while multiple tower sections may be added at a single time, such as lifting and adding multiple tower sections pre-connected on the ground, doing so requires a concomitant lengthening of the climbing assembly such that the climbing assembly may form an opening of the vertical length required to multiple tower sections connected-end-to-end. However, lengthening of the climbing assembly to form a vertically longer opening results in a weakening of the tower crane at the interface between the tower and the boom assembly, which limits the maximum vertical height at which the boom assembly may be safely operated. Additionally, for mobile tower cranes, lengthening of the climbing assembly results in an increase of the vertical height of the boom assembly when the tower crane is in a retracted or transportation configuration. In the transport configuration, it is desired to have the boom assembly at as low a vertical height as possible to minimize a vertical height of the center-of-mass of the tower crane Doing so makes the tower crane easier to transport, particularly along uneven terrain.

Accordingly, embodiments of top-loading tower cranes are described that allow for a plurality of pre-connected tower sections to be loaded simultaneously to a tower assembly of the tower crane. Particularly, tower cranes described include crane floors (upon which a boom of the tower crane is positioned) that selectably form an opening. The opening permits the tower unit to be vertically lowered by the boom of the crane through the opening and onto an upper end of the tower assembly such that the tower unit may be attached and thereby added to the tower assembly. In this manner, multiple pre-connected tower sections may be added simultaneously to the tower assembly of the tower crane. This minimizes the time required for assembling the tower crane while also avoiding the need to undesirably increase a longitudinal length of a climbing assembly of the tower crane. As will be described further, embodiments of top-loading tower cranes include a slew bearing that may be moved relative to a central axis of the tower assembly. Moving the slew bearing may form the opening through which the tower unit may be vertically lowered by the boom into contact with the upper end of the tower assembly. In some embodiments, the slew bearing may move laterally relative to the crane floor. In other embodiments, the crane floor and slew bearing may move laterally in concert relative to the tower assembly of the tower crane.

Referring to FIGS. 1-5, an embodiment of a top-loading tower crane 10 is shown. Tower crane 10 may be utilized to assemble a wind turbine 1 shown in FIG. 5; however, it may be understood that tower crane may be utilized for a variety of purposes other than assembling wind turbines. In this exemplary embodiment, tower crane 10 generally includes a support base 20, an extendable tower assembly 50 extending vertically upwards from the support base 20, a climbing frame or assembly 70 surrounding a portion of the tower assembly 50, and a boom assembly 100 positioned atop the tower assembly 50. It may be understood that in other embodiments the tower crane 10 may include components in addition to the components shown in FIG. 1-5.

In this exemplary embodiment, the support base 20 of tower crane 10 generally includes a central support structure or frame 22, a plurality of inclined members or braces 30, a plurality of horizontal members or braces 36, a plurality of self-propelled transporters or crawlers 40, and a control system or controller 48. Support base 20 physically supports the tower assembly 50, climbing assembly 70, and boom assembly 100 of tower crane 10, by transferring loads from assemblies 50, 70, and 100 to the ground 5. Additionally, in this exemplary embodiment, support base 20 is configured to transport the tower crane 10 across the ground 5 when tower crane 10 is in a transport configuration as shown specifically in FIG. 1. In FIG. 1, the boom assembly 100 is positioned at a first or minimum vertical height 17 from the ground 5. It may be understood that in other embodiments the support base 20 of tower crane 10 may be stationary and not configured for transporting tower crane 10 across the ground 5. For example, support base 20 may comprise a stationary support base which does not include inclined braces 30, horizontal braces 36, or crawlers 40.

The central support frame 22 of support base 20 has a rectangular, box-like shape or configuration and includes a first or vertically upper end 24 and a second or vertically lower end 26 opposite upper end 24. Additionally, central support frame 22 extends along a central or longitudinal axis 15 of the tower crane 10. Each inclined brace 30 of tower crane 10 pivotably connects to the upper end 24 of central support frame 22 at a first end thereof, and to one of the crawlers 40 at an opposing second end thereof. Each of the inclined braces may include a linear actuator, such as a hydraulic cylinder for extending and retracting the second end of the inclined brace relative to the first end. The extension and retraction of inclined braces 30 may be controlled by the controller 48 of support base 20 to maintain central support frame 22 in a vertically upright orientation (relative to the direction of gravity) as the tower crane 10 traverses across uneven terrain, such as ground 5.

Additionally, each horizontal brace 36 of tower crane 10 pivotably connects to the lower end 26 of central support frame 22 at a first end thereof, and to one of the crawlers 40 at an opposing second end thereof. In some embodiments, support base 20 includes a plurality of horizontal linear actuators, such as hydraulic cylinders, that are coupled between the lower end 26 of central support frame 22 and the plurality of horizontal braces 36. The horizontal linear actuators permit the plurality of horizontal braces to pivot the horizontal braces 36 relative to the central support frame 22 to assist in shifting tower crane 10 from the transport configuration to a stationary configuration. In the stationary configuration, tower crane 10 may, as an example, assemble a wind tower 3 and a nacelle 7 of the wind turbine 1. The horizontal linear actuators may be controlled by the controller 48 of support base 20.

In this exemplary embodiment, each crawler 40 of support base 20 generally includes one or more crawler tires or tracks driven by a motor of the crawler 40. When in the retracted configuration, tower crane 10 may be transported along the ground 5 to a worksite, such as the location of wind turbine 1, through the operation of the one or more crawler tracks by the motor of each crawler 40.

Referring still to FIGS. 1-5, tower assembly 50 of tower crane 10 extends along central axis 15 and generally includes a plurality of tower sections 52 connected end-to-end along the vertical length of tower assembly 50. Tower assembly 50 extends along a central axis coaxial with the central axis 15 of tower crane 10. Thus, axis 15 may also be referred to as the central axis 15 of tower assembly 50. In this exemplary embodiment, each tower section 52 of tower assembly 50 has a rectangular, box-like shape or configuration and may be comprised of a plurality of support beams or members coupled together, such as steel I-beams or other types of structural support members. Additionally, fasteners located at each longitudinally opposed end of each tower section 52 couple the tower sections 52 end-to-end as the vertical length of tower assembly 50 is extended.

Figure 2:
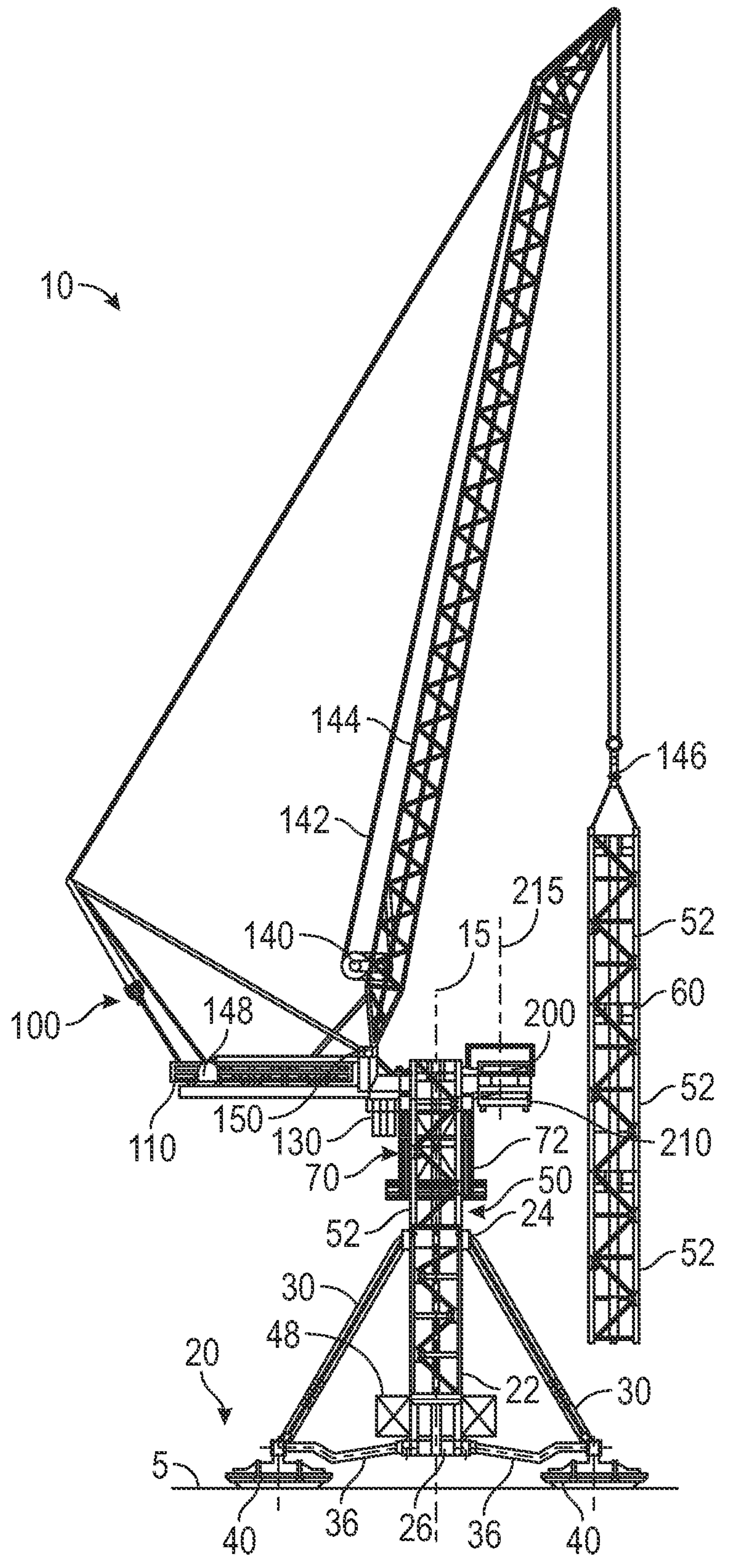
Figure 3:
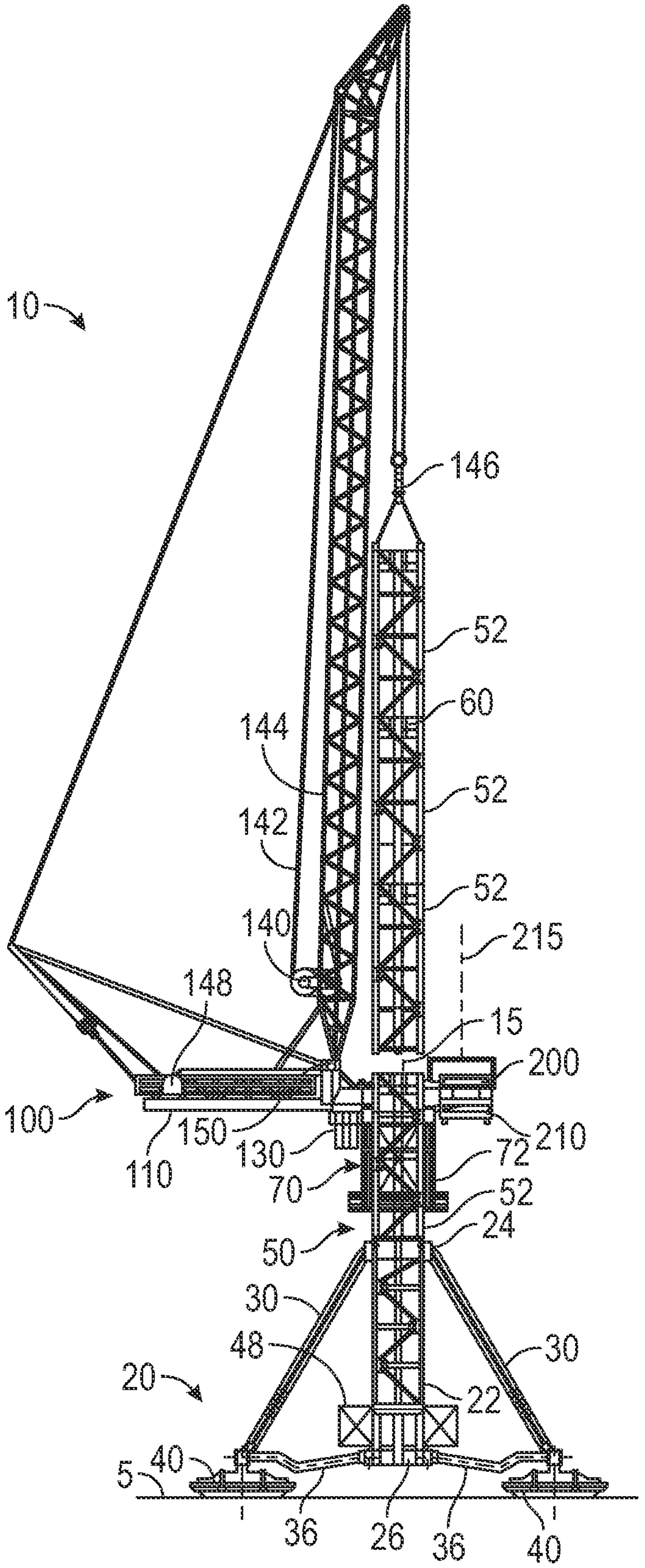
Figure 4:
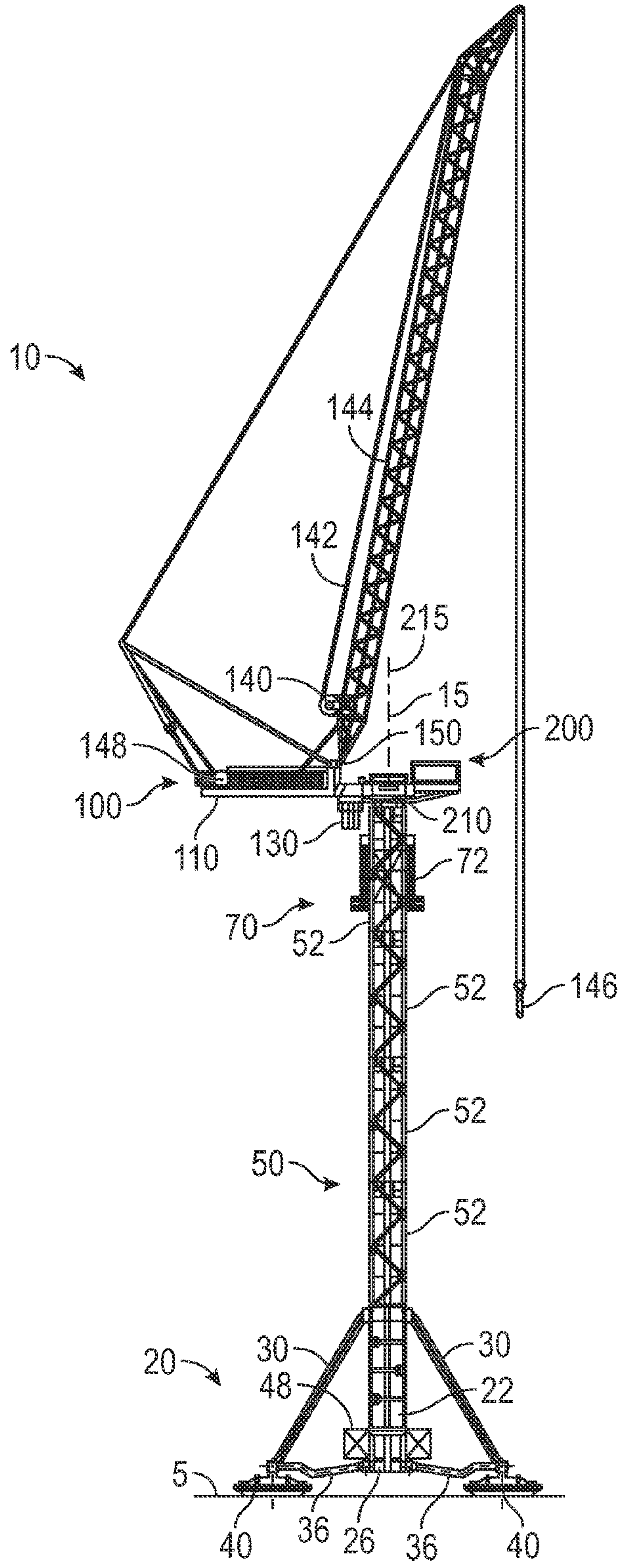
Figure 5:
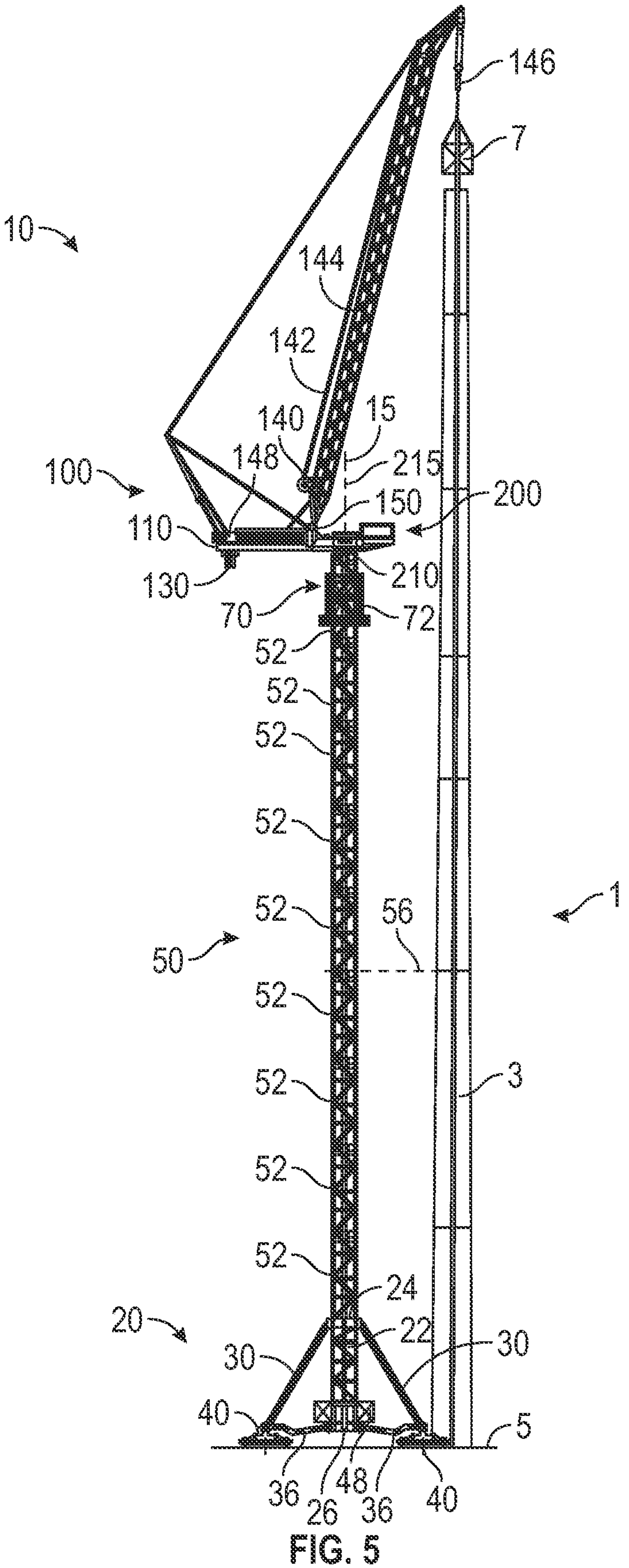

As shown particularly in FIG. 1, in the retracted configuration of tower crane 10, tower assembly 50 includes only a single tower section 52. A vertically lower end of single tower section 52 is connected to the upper end 24 of the central support frame 22 of support base 20. As will be described further, tower crane 10 is configured to add or top load a plurality of tower sections 52 to the tower assembly 50 at a single time. For example, as shown particularly in FIGS. 2 and 3, tower crane 10 may top load a tower unit 60 comprising a plurality of tower sections 52 connected end-to-end at a single time. FIGS. 2 and 3 illustrate the tower unit 60 as comprising three separate tower sections 52 connected end-to-end; however, it may be understood that in other embodiments the tower unit 60 may comprise fewer or more than three separate tower sections 52. In some embodiments, tower crane 10 may top load only a single tower section 52 to the tower assembly 50. As an example, tower crane 10 may top load an extended tower section having a greater length than the tower sections 52 forming tower assembly 50.

Figure 7:
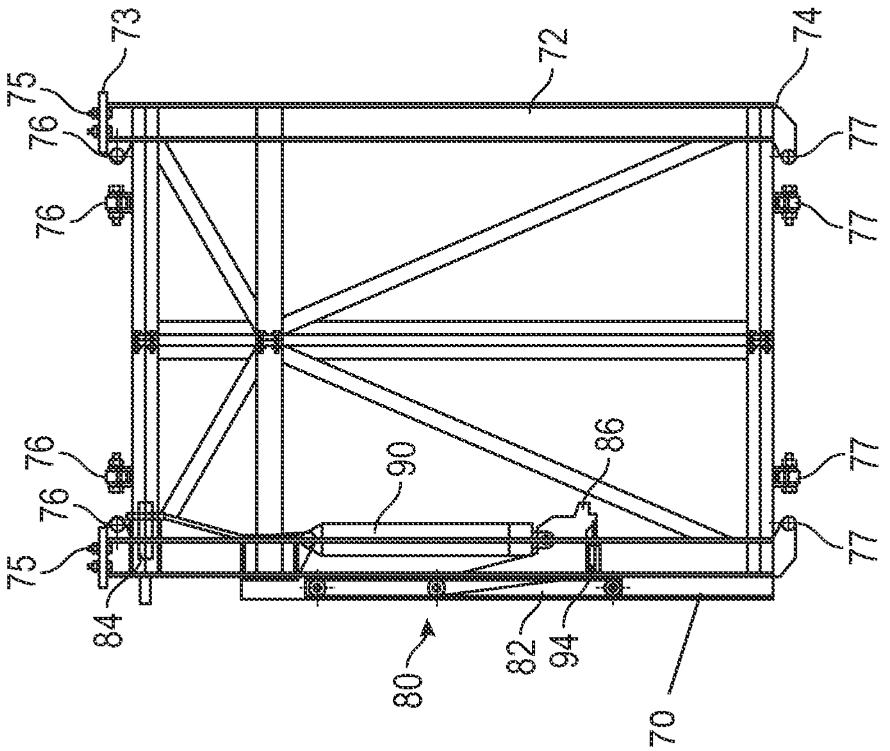
FIG. 7 is a front view of the climbing assembly of the tower crane of FIGS. 1-5.
Figure 6:
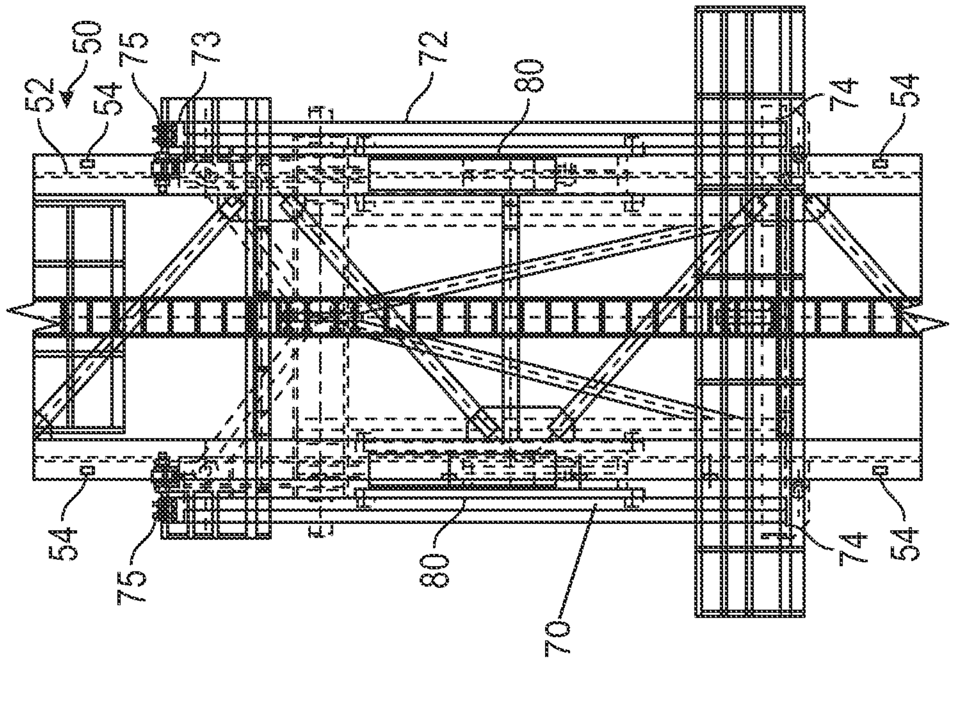
FIG. 6 is a zoomed-in side view of an embodiment of a climbing assembly of the tower crane of FIGS. 1-5.
Figure 8:
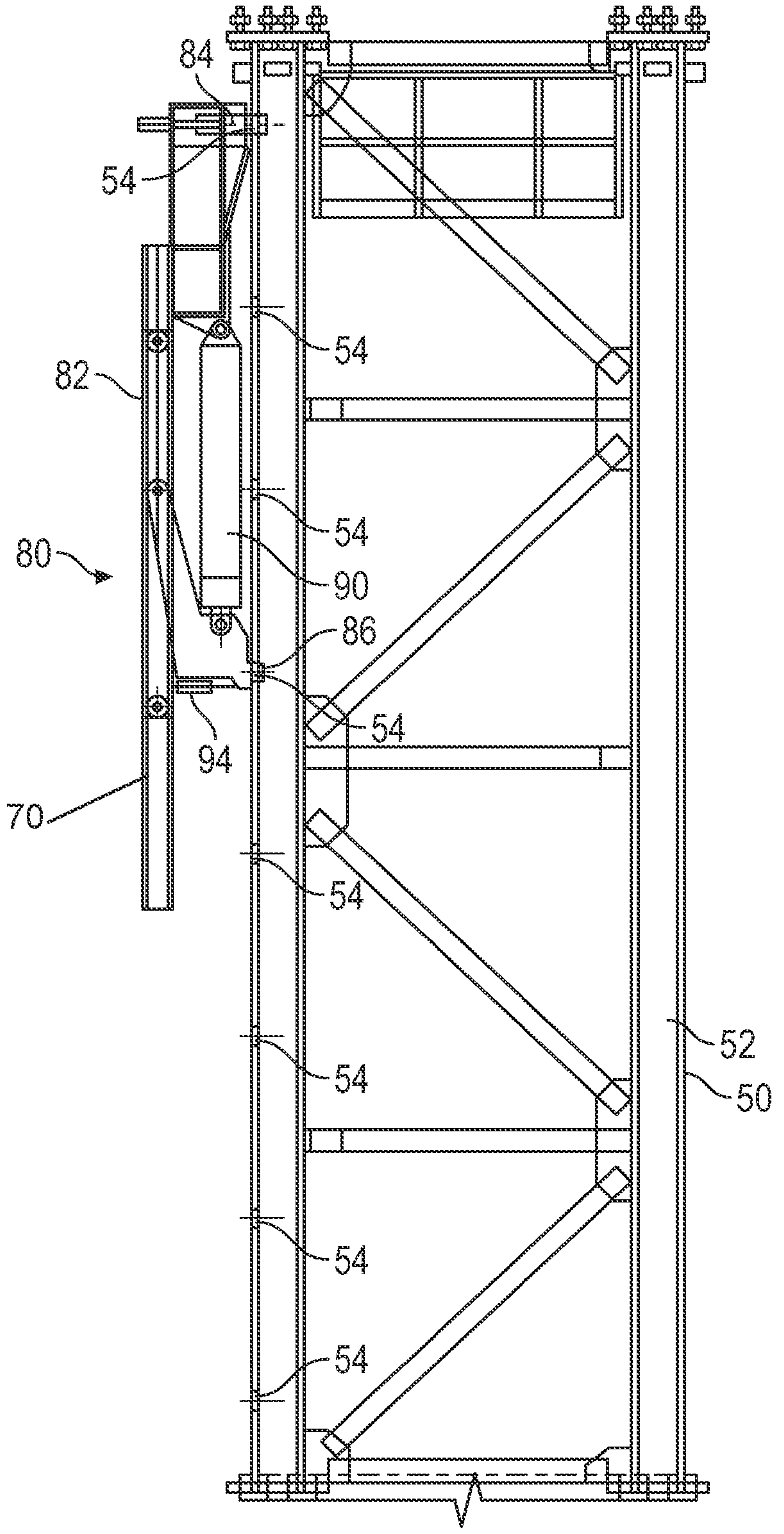
FIG. 8 is a front view of an embodiment of a climbing assembly of the tower crane of FIGS. 1-5.
Figure 9:
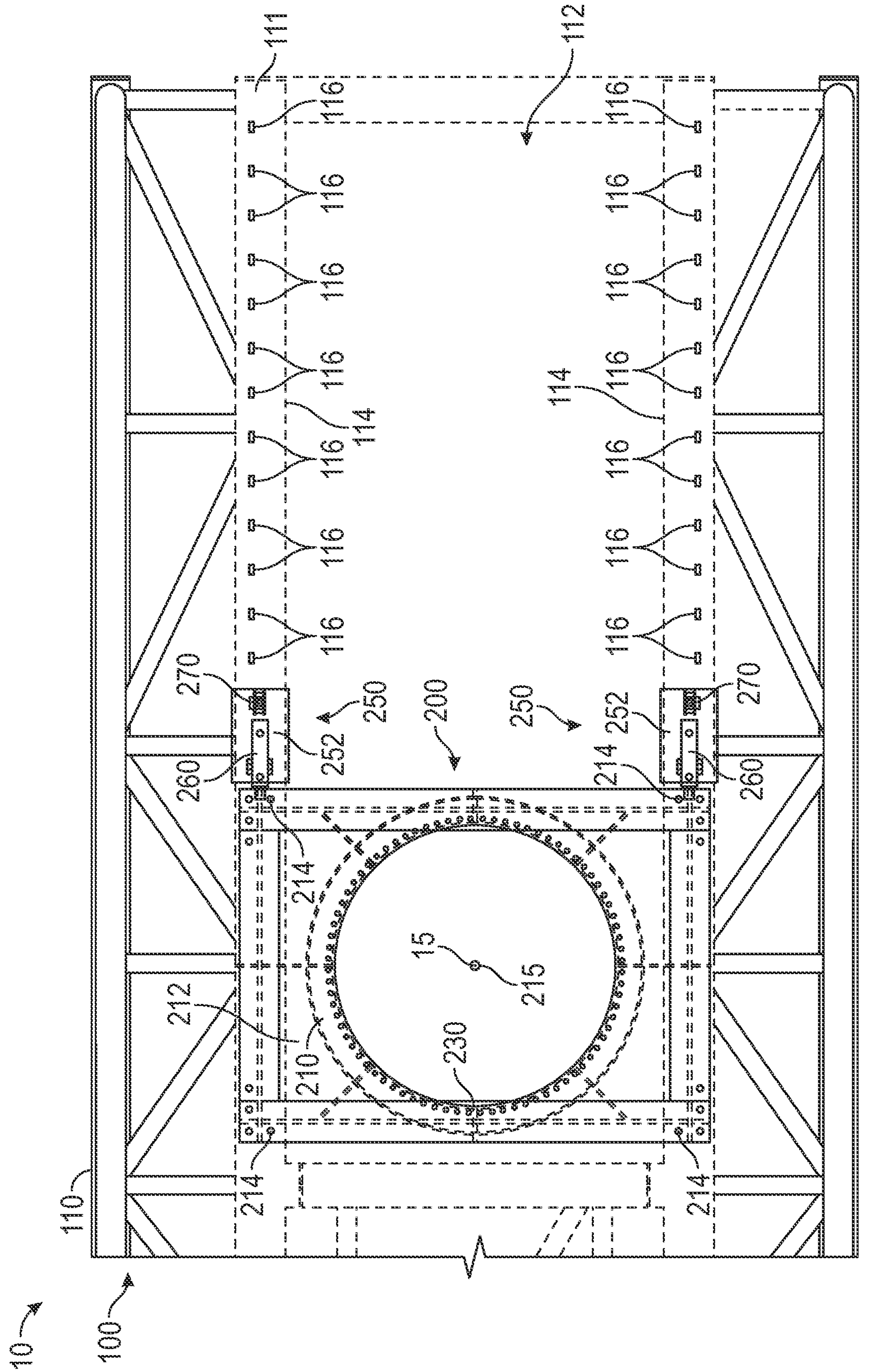
FIG. 9 is a plan view of the tower crane of FIGS. 1-5.
Figure 10:
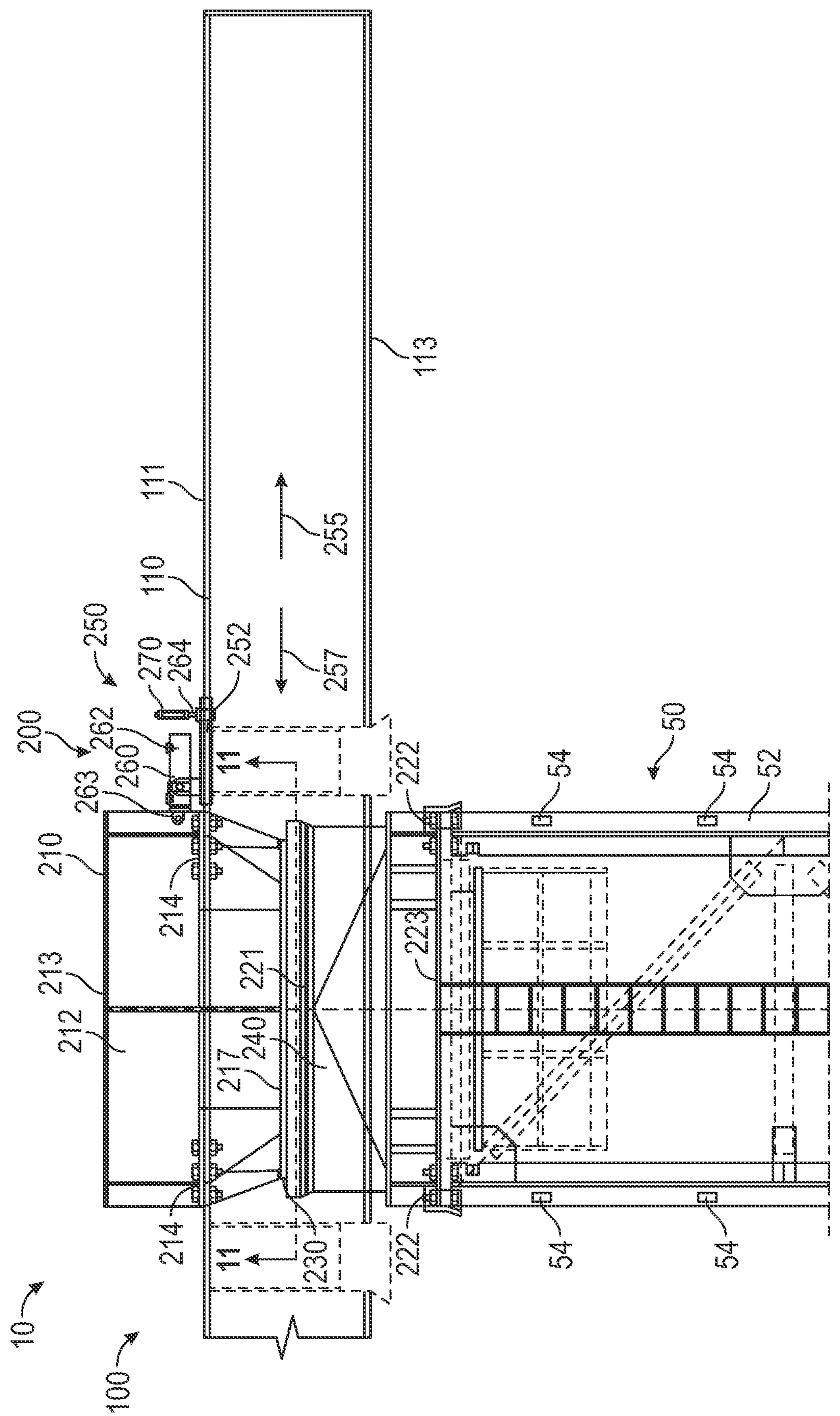
FIG. 10 is another front view of the tower crane of FIGS. 1-5.
Figure 11:
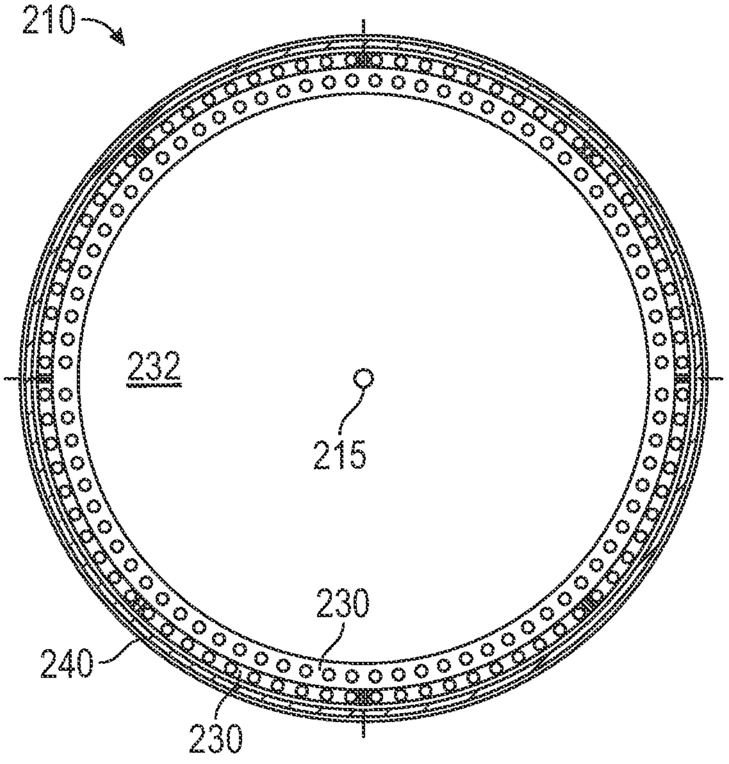
FIG. 11 is cross-sectional view along line 11-11 of FIG. 10.
Figure 12:
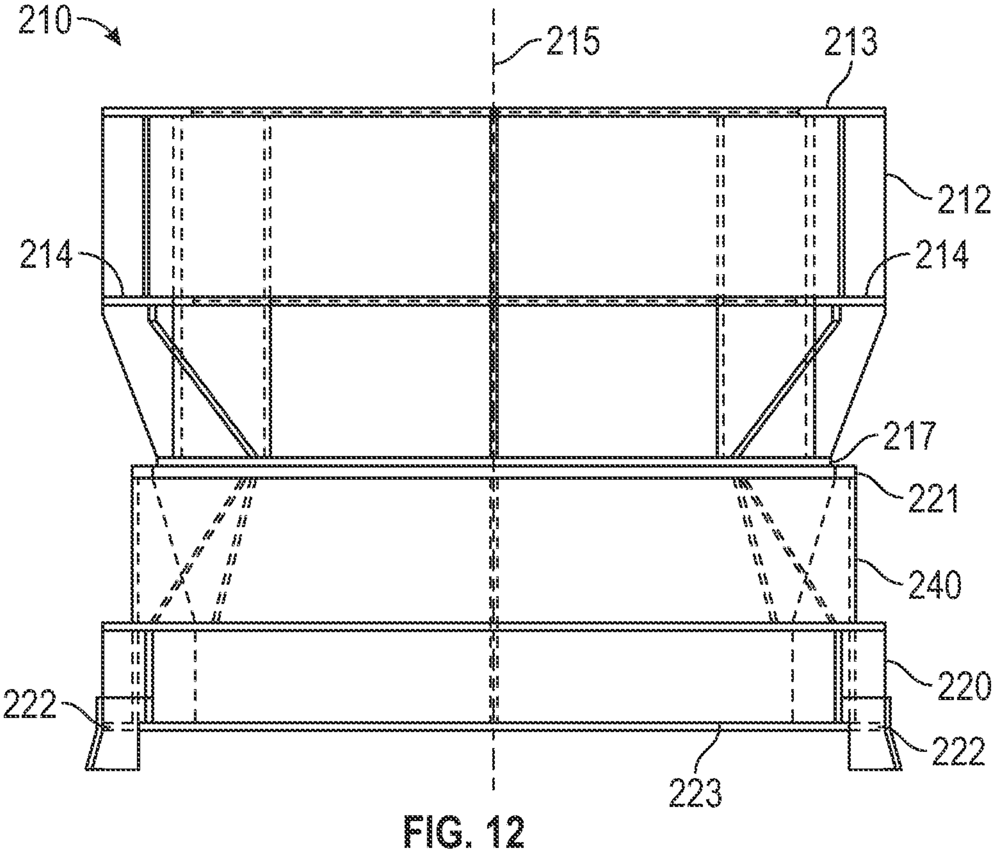
FIG. 12 is a front view of an embodiment of a slew bearing of the tower crane of FIGS. 1-5.

Referring now to FIGS. 6-8, views of the climbing assembly 70 of tower crane 10 are shown. In this exemplary embodiment, climbing assembly 70 generally includes a climbing frame 72 and a pair of extendable latching assemblies 80. Climbing frame 72 of climbing assembly 70 extends along central axis 15 (shown in FIGS. 1-4) and has a rectangular, box-like shape or configuration. Climbing frame 72 may be comprised of a plurality of support beams or members coupled together, such as steel !-beams or other types of structural support members. Given that tower sections 52 are not side loaded through an opening defined by the climbing frame 72, the climbing frame 72 may not include an opening sized to accommodate a tower section 52 along any of the four sides of the climbing frame 72.

Climbing frame 72 has a first or vertically upper end 73 and a second or vertically lower end 74 opposite upper end 73. In this exemplary embodiment, climbing frame 72 includes a plurality of connectors 75 located at the upper end 73 thereof. Connectors 75 are positioned at the four corners of climbing frame 72 and each comprise a plurality of fasteners, such as threaded fasteners for connecting climbing frame 72 to the boom assembly 100. For example, the fasteners of each connector 75 may be manually fastened and unfastened by one or more operators of tower crane 10. Additionally, a plurality of upper rollers 76 are coupled to climbing frame 72 at the upper end 73 thereof, while a plurality of lower rollers 77 are coupled to lower end 74 of climbing frame 72. Rollers 76, 77 of climbing assembly 70 roll along each of the four sides of the tower section 52 around which the climbing assembly 70 is disposed to ensure that climbing assembly 70 remains aligned with the central axis 15 of tower crane 10.

The latching assemblies 80 of climbing frame 72 selectably latch the climbing assembly 70 to a given tower section 52 of the tower assembly 50 such that the climbing assembly 70 may climb either vertically upwards or vertically downwards along the tower section 52. In this exemplary embodiment, each latch assembly 80 generally includes a dolly frame 82, a pivotable indent or latch 86, a linear climbing actuator 90, and a linear locking actuator 94. Dolly frame 82 extends between a vertically upper end and a vertically lower end where a first or vertically upper indent or latch 84 of the latching assembly 80 is formed at the vertically upper end of the dolly frame 82.

The pivotable or lower latch 86 of latching assembly 80 is pivotably coupled to the dolly frame 82 such that lower latch 86 may pivot away from and towards the tower section 52 to which the climbing assembly 70 is coupled. Lower latch 86 may also be referred to as vertically lower indent or latch 86 given that it is positioned lower than the upper latch 84 of latching assembly 80. The climbing actuator 90 is pivotably coupled between the dolly frame 82 and the lower latch 86. In addition to pivoting the lower latch 86, the climbing actuator 90 may also linearly extend the lower end of the dolly frame 82 relative to the upper end of frame 82 in response to extending the actuator 90. Conversely, climbing actuator 90 may linearly retract the lower end of the dolly frame 82 towards the upper end of frame 82 in response to retracting the actuator 90. Additionally, the locking actuator 94, which may also comprise a hydraulic cylinder, is also pivotably coupled between the dolly frame 82 and the lower latch 86. Locking actuator 94 may be both retracted to pivot lower latch 86 away from the tower section 52 and extended to pivot the lower latch 86 towards the tower section 52. Operation of the climbing actuator 90 and locking actuator 94 of each latching assembly 80 may be controlled by the controller 48 of tower crane 10.

In this exemplary embodiment, latches 84, 86 of each latching assembly 80 of the climbing assembly 70 are separately and matingly receivable in a plurality of notches or receptacles 54 formed in each of the tower sections 52 of tower assembly 50. Particularly, notches 54 are vertically spaced along each of a pair of vertically extending rails of the tower section 52 that face the latching assemblies 80 of climbing assembly 70. During operation of the pair of latching assemblies 80, the climbing actuators 90 and locking actuators 94 of latching assemblies 80 may be operated to force the climbing assembly 70 vertically upwards or vertically downwards along the tower assembly 50.

Specifically, to climb vertically upwards along the tower assembly 50 the locking actuator 94 of each latching assembly 80 may be held in an extended configuration. Locking the lower latch 86 of each assembly 80 into a corresponding pair of notches 54 of a given tower section 52 of the tower assembly 50, securing the climbing assembly 70 to the tower assembly 50. With lower latches 86 locked to the tower section 52, climbing actuators 90 may be extended to force upper latches 84 vertically upwards along the tower assembly 50 until the upper latches 84 are received in the next pair of notches 54. The next pair of notches are positioned vertically above the pair of notches 54 in which the upper latches 84 were originally received. In some embodiments, upper latches 84 each include a linear actuator used to selectably extend and retract the upper latches 84 towards tower assembly 50 (locking the upper latches 84 into a corresponding pair of notches 54) and away from tower assembly 50 (releasing the upper latches 84 from the corresponding pair of notches 54), respectfully.

With upper latches 84 received in the vertically elevated pair of notches 54 the climbing assembly 70 may be secured to the tower assembly 50 through the upper latches 84 such that lower latches 86 may be released from the tower assembly 50 without releasing the climbing assembly 70 itself from the tower assembly 50. Particularly, with upper laches 84 now received in the vertically elevated pair of notches 54, locking actuators 94 are retracted to release lower latches 86 from the corresponding pair of notches 54 into which they were received. Following the retraction of locking actuators 94, climbing actuators 90 are retracted to retract the lower end of dolly frame 82 towards the now extended upper end of the frame 82. The lower latches 86 may now be locked into a pair of notches 54 positioned vertically above the notches 54 in which latches 86 were originally received. This process may be repeated until climbing assembly 70 achieves a desired vertical position along the tower assembly 50. Additionally, the sequence of operations previously described may be reversed to have the climbing assembly 70 descend vertically along the tower assembly 50. Further, it may be understood that in other embodiments, mechanisms other than latching assemblies 80 may be utilized for transporting the climbing frame 72 of climbing assembly 70 along the tower assembly 50.

Referring again to FIGS. 1-5, the boom assembly 100 of tower crane 10 is generally configured to lift both tower sections 52 (and tower units 60) along with separate equipment as part of a lifting operation performed by the tower crane 10, such as assembling the wind turbine 1 shown in FIG. 5. In this exemplary embodiment, the boom assembly 100 of tower crane 10 generally comprises a "luffing" boom; however, it may be understood that in other embodiments boom assembly 100 may comprise a "flat top" boom or other boom configurations. Boom assembly 100 generally includes a crane floor 110, a counterweight 130, a luffing winch 140, a luffing boom 144, one or more boom actuators 148, and a transportable slew bearing assembly 200. The crane floor 110 provides structural support to boom assembly 100 and connects boom assembly 100 with tower assembly 50 and climbing assembly 70 of tower crane 10. Additionally, crane floor 110 houses the counterweight 130 of boom assembly 100.

Luffing winch 140 of boom assembly 100 is supported on crane floor 110 and receives a lifting cable 142 of boom assembly 100, which may be extended from and retracted to the luffing winch 140. The luffing boom 144 of boom assembly 100 controls the position of a lifting member 146, such as a lifting hook, of boom assembly 100, which is suspended from a distal end of luffing boom 144 and is connected to an end of the lifting cable 142. Luffing boom 144 is supported on the crane floor 110 and extends at an inclined angle from the crane floor 110. Additionally, an angle of inclination of the luffing boom 144 may be controlled by the one or more boom actuators 148 of boom assembly 100. Particularly, a proximal end of the luffing boom 144 is pivotably connected to the crane floor 110 at one or more pivotable joints 150. Luffing boom 144 may be pivoted about a horizontally extending pivot axis (extending through the one or more pivotable joints 150) by the one or more boom actuators 148 to control a vertical position of the lifting member 146. In this manner, the lifting member 146 may be vertically raised and lowered without needing to vertically raise and lower the crane floor 110 of boom assembly 100.

The slew bearing assembly 200 of boom assembly 100 includes a slew bearing 210 that connects the crane floor 110 (and the components supported by the crane floor 110 including luffing boom 144) with the tower assembly 50. Particularly, slew bearing 210 permits the crane floor 110, and thus the luffing boom 144 supported on the crane floor 110, to pivot or rotate about the central axis 15 of tower crane 10. In some embodiments, slew bearing 210 permits luffing boom 144 to rotate 360 degrees about the central axis 15 such that luffing boom 144 may attach to any piece of equipment on the ground 5 and located within a radius of the tower crane 10 based on the longitudinal length of luffing boom 144. Additionally, as will be described further, slew bearing 210 is shiftable from a first or working position (shown in FIGS. 1, 4, and 5) in which a central or longitudinal axis 215 of the slew bearing 210 is coaxially aligned with the central axis 15 of tower crane 10, and a second or storage position in which the central axis 215 of slew bearing 210 is offset or spaced from the central axis 15. Particularly, in this exemplary embodiment, in the storage position the central axis 215 of slew bearing 210 is laterally offset from the central axis 15. It may be understood that in addition to being transported laterally when moving between the working and storage positions, the slew bearing 210 may also be transported vertically when moving between the working and storage positions. Central axis 215 also comprises a rotational axis about which crane floor 110 rotates relative to the tower assembly 50. Thus, central axis 215 may also be referred to herein as rotational axis 215.

Referring to FIGS. 9-12, views of the slew bearing assembly 200 are shown. In this exemplary embodiment, crane floor 110 defines an enclosed opening 112 in which slew bearing 210 is received and which extends entirely between an upper end 111 and a lower end 113 of the crane floor 110. Particularly, a parallel pair of rails 114 (each extending laterally relative to central axis 15) of the crane floor 110 define the opening 112, each rail 114 defining a plurality of receptacles or notches 116 that are spaced longitudinally along each rail 114. As will be described further, the slew bearing assembly 200 interfaces with the notches 116 of rails 114, which collectively form a pair of traversable tracks, to transport the slew bearing 210 through the opening 112 between the working and storage positions.

Slew bearing assembly 200 generally includes slew bearing 210 and a pair of transport assemblies 250 for shifting the slew bearing 210 between the working and storage positions. As shown particularly in FIGS. 11 and 12, slew bearing 210 of slew bearing assembly 200 has a central or longitudinal axis 215 and generally includes a first or vertically upper support 212, a second or vertically lower support 220, an annular inner bearing ring or race 230, and an annular outer bearing ring or race 240. Upper support 212 has a first or vertically upper end 213 defining a vertically upper end of the slew bearing 210, and a second or vertically lower end 217. Additionally, upper support 212 includes a plurality of upper mounts 214 positioned about central axis 215. Upper mounts 214 may be attached or mounted to the crane floor 110 to prevent relative movement between the upper support 212 of slew bearing 210 and the crane floor 110. For example, upper mounts 214 may be fastened via a plurality of fasteners to the crane floor 110 to secure the slew bearing 210 to the crane floor 110.

Lower support 220 of slew bearing 210 has a first or vertically upper end 221, and a second or vertically lower end 223 opposite upper end 221 that defines a vertically lower end of the slew bearing 210. Additionally, lower support 220 includes a plurality of lower mounts 222 positioned about central axis 215 of slew bearing 210 and located at the lower end 223 of lower support 220. Lower mounts 222 may be attached or mounted to the upper end of the uppermost tower section 52 of the tower assembly 50 to prevent relative movement between the lower support 220 of slew bearing 210 and the tower assembly 50. For example, lower mounts 222 may be fastened via a plurality of fasteners to the upper end of the uppermost tower section 52 of tower assembly 50 to secure the slew bearing 210 to the tower assembly 50.

The lower end 217 of upper support 212 is coupled to the inner bearing race 230 whereby relative rotation between upper support 212 and inner bearing race 230 is restricted. Inner bearing race 230 is annular in shape and defines a central opening or passage 232. Additionally, inner bearing race 230 is received in and positioned concentric relative outer bearing race 240. A plurality of bearing elements, such as ball bearings, roller bearings, or other bearing elements, are positioned between inner bearing race 230 and outer bearing race 240. In this configuration, inner bearing race 230 is permitted to rotate relative to both the outer bearing race 240 and the lower support 220 of slew bearing 210. Additionally, the outer bearing race 240 is connected to the lower support 220 such that relative rotation between outer bearing race 240 and lower support 220 is restricted. In this configuration, the crane floor 110, upper support 212, and inner bearing race 230 may rotate in concert about the central axis 215 of slew bearing 210 relative to outer bearing racing 240, lower support 220, and the tower assembly 50.

Referring back to FIGS. 9-12, transport assemblies 250 selectably transports slew bearing 210 from a working position in which the central axis 215 of slew bearing 210 is aligned and coaxial with central axis 15 and a storage position, laterally spaced (relative central axis 15) from the working position and in which the central axis 215 of slew bearing 210 is laterally offset from central axis 15. In this exemplary embodiment, each transport assembly 250 generally includes a transport frame 252, a linear transport actuator 260, a slew latch 264, and a linear locking actuator 270. The transport actuators 260 and locking actuators 270 comprise linear actuators, such as hydraulic cylinders. However, it may be understood that the configuration of transport actuators 260 and locking actuators 270 may vary. Additionally, the operation of actuators 260, 270 may be controlled by the controller 48 of tower crane 10.

The transport frames 252 of transport assemblies 250 are slidably mounted on the rails 114 of crane floor 110. The transport actuators 260 include a base 262 (shown in FIG. 10) and an arm or link 263 (shown in FIG. 10) opposite the base 262. The base 262 of each transport actuator 260 is mounted to a corresponding transport frame 252 while the arm 263 of each transport actuator 260 is attached to the upper support 212 of slew bearing 210.

The arm 263 of each transport actuator 260 is extendable and retractable in a lateral direction relative to the base 262 of the transport actuator 260, which is also relative to central axis 15. In this configuration, the arm 263 of a transport actuator 260 may be extended to displace base 262 and the transport frame 252 in a first lateral direction 255 (arrow shown in FIG. 10) relative to and away from the arm 263 and the attached slew bearing 210. Conversely, the arm 263 of a transport actuator 260 may be retracted to displace base 262 and the transport frame 252 in a second lateral direction 257 (arrow shown in FIG. 10), which is opposite the first lateral direction 255, relative to and towards the arm 263 and the attached slew bearing 210.

Slew latches 264 and locking actuators 270 are mounted on the transport frames 252 of transport assemblies 250. The slew latches 264 of transport assemblies 250 are selectably extendable and retractable via locking actuators 270 of assemblies 250. The slew latches 264 selectably lock the transport frames 252 of assemblies 250 to the rails 114 of crane floor 110. Particularly, the slew latch 264 of each transport assembly 250 includes a retracted or unlocked position that is retracted from the corresponding rail 114 of crane floor 110. The retracted position permits the transport frame 252 on which the slew latch 264 and locking actuator 270 is mounted to slide along the rail 114 of crane floor 110. The slew latch 264 of each transport assembly 250 also includes an extended or locked position in which the slew latch 264 is matingly received in one of the notches 116 spaced along the rail 114 on which the transport frame 252 is positioned. With the slew latch 264 in the locked position, the transport frame 252 on which the slew latch 264 is mounted is prevented from moving in either lateral direction 255, 257 relative to the crane floor 110.

Figure 13:
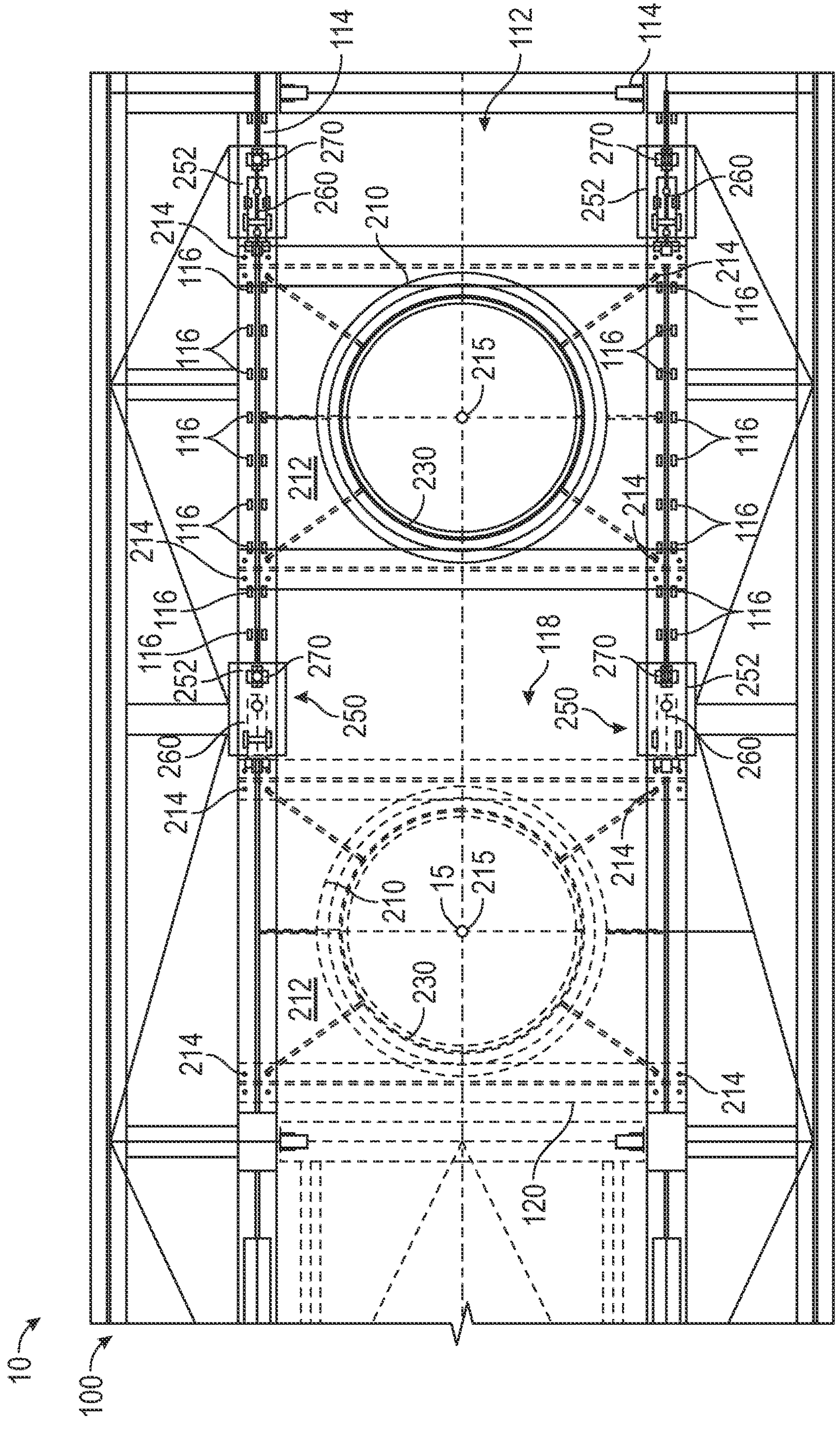
FIG. 13 is another plan view of the tower crane of FIGS. 1-5.
Figure 14:
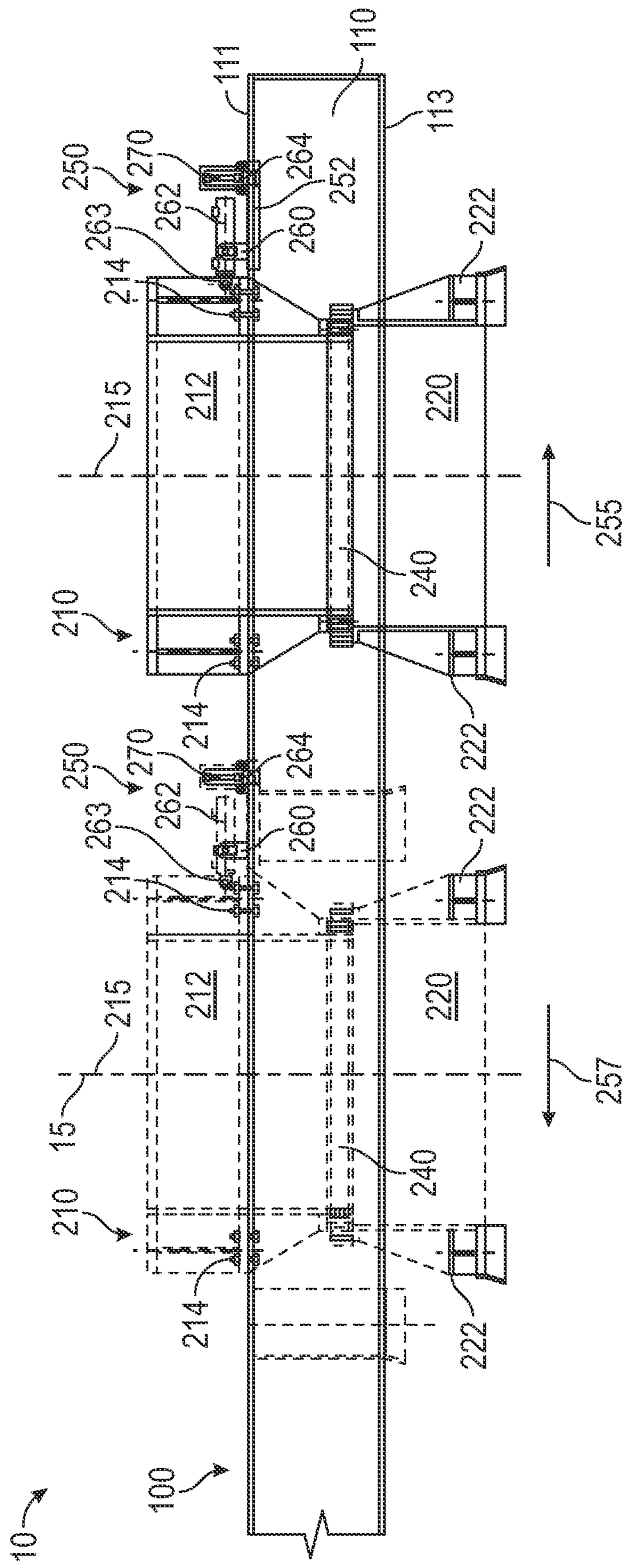
FIG. 14 is another front view of the tower crane of FIGS. 1-5.

Referring to FIGS. 13 and 14, the actuators 260, 270 of transport assemblies 250 may be operated to transport slew bearing 210 between the working position and the storage position. It may be noted that FIGS. 13, 14 illustrate slew bearing in both the working and storage positions to indicate the lateral spacing between the two positions. For example, with slew bearing 210 disconnected from both the tower assembly 50 and the crane floor 110 (as will be described further) and slew latches 264 disposed in the unlocked position, the transport actuators 260 of transport assemblies 250 may be extended to slide the transport frames 252 in the first lateral direction 255 relative to the slew bearing 210. Following the extension of transport actuators 260, the slew latches 264 of transport assemblies 250 may be actuated by locking actuators 270 into the locked position, securing the transport frames 252 to the rails 114 of crane floor 110. The transport actuators 260 may then be actuated to retract the arms 263 toward the secured transport frames 252, thereby sliding the slew bearing 210 coupled thereto in the first lateral direction 255 towards the storage position. This process may be repeated until the slew bearing 210 has been transported by the transport assemblies 250 along rails 114 to the storage position. As shown particularly in FIG. 13, a tower opening 118 is formed within the crane floor 110. Tower opening 118 extends between a lateral rail 120 extending between the pair of rails 114 and the slew bearing 210 disposed in the storage position. The central axis 15 extends through the tower opening 118. The tower opening 118 is configured such that a tower unit 60 may be top loaded to the tower assembly 50. The tower unit 60 may be then lowered through the tower opening 118 by luffing boom 144.

Referring again to FIGS. 1-5, as described previously, FIG. 1 illustrates tower crane 10 in a retracted configuration providing boom assembly 100 with minimum height 17. Tower assembly 50 of tower crane 10 may be extended by first transporting the slew bearing from the working position shown in FIG. 1 to the storage position shown in FIG. 2. In some embodiments, climbing assembly 70 may climb upwards along tower assembly 50 and connected to the crane floor 110 of boom assembly 100 before transporting the slew bearing 210 from the working position to the storage position so that the boom assembly 100 may be supported directly by climbing assembly 70 with slew bearing 210 in the storage position.

With slew bearing 210 in the storage position, a tower unit 60 may be lifted by the luffing boom 144 from the ground to a height that is vertically above the crane floor 110 as shown particularly in FIGS. 2, 3. Luffing boom 144 may position the tower unit 60 vertically above crane floor 110 in a position aligned with the central axis 15 of tower crane 10 as shown particularly in FIG. 3. Luffing boom 144 may then lower the tower unit 60 through the opening 118 (not shown) and onto the upper end of the tower assembly 50. With the tower unit 60 landed against the tower assembly 50, the tower unit 60 may be attached (for example, with a plurality of fasteners) to the tower assembly 50 to thereby add the tower unit 60 to the tower assembly 50.

Following the addition of the tower unit 60 to the tower assembly 50, climbing assembly 70 may climb along and thereby vertically lift the boom assembly 100 along tower assembly 50 until the crane floor 110 is positioned vertically above the tower assembly 50. In this configuration, slew bearing 210 may be transported back to the working position from the storage position as shown particularly in FIG. 4. The upper end of the tower assembly 50 may then be coupled to the slew bearing 210 and the climbing assembly 70 may be disconnected from the crane floor 110 and lowered from the crane floor 110. This process may be repeated until the tower crane 10 is in an extended configuration as shown particularly in FIG. 5 where tower crane 10 is shown completing the assembly of wind turbine 1 by lowering the nacelle 7 atop the wind tower 3 of wind turbine 1. Additionally, as the tower crane 10 is assembled, one or more support struts 56 may be coupled between the tower assembly 50 and the wind tower 3 of wind turbine 1 to provide further support to tower crane 10. Support struts 56 allow tower crane 10 to transfer loads from tower assembly 50 to the wind tower 3 of wind turbine 1, thereby providing additional physical support for the boom assembly 100 of tower crane 10.

In some embodiments, the crane floor of the boom assembly may itself shift between a working position, and a storage position spaced from the working position. The shifting, a tower opening may be defined through which a single tower section or a plurality of coupled tower sections forming a tower unit may be top loaded to a tower assembly of the tower crane. For example, referring now to FIGS. 15 and 16, another embodiment of a top-loading tower crane 300 is shown. Tower crane 300 has a central or longitudinal axis 305 and includes features in common with the tower crane 10 shown in FIG. 1, and shared features are labeled similarly. Particularly, tower crane 300 generally includes support base 20, tower assembly 50, a climbing assembly 310, and a boom assembly 330.

Figure 16:
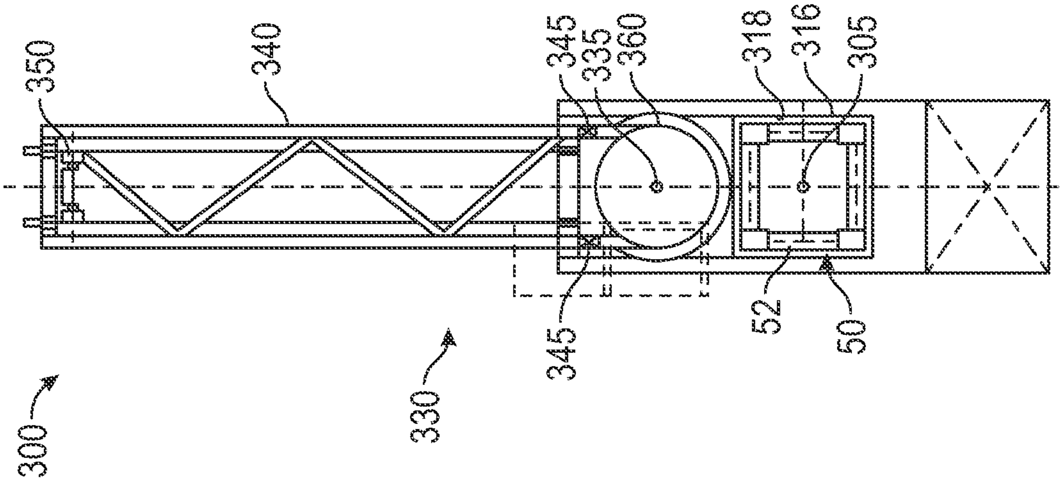
FIG. 16 is a cross-sectional view along line 16-16 in FIG. 15.
Figure 15:
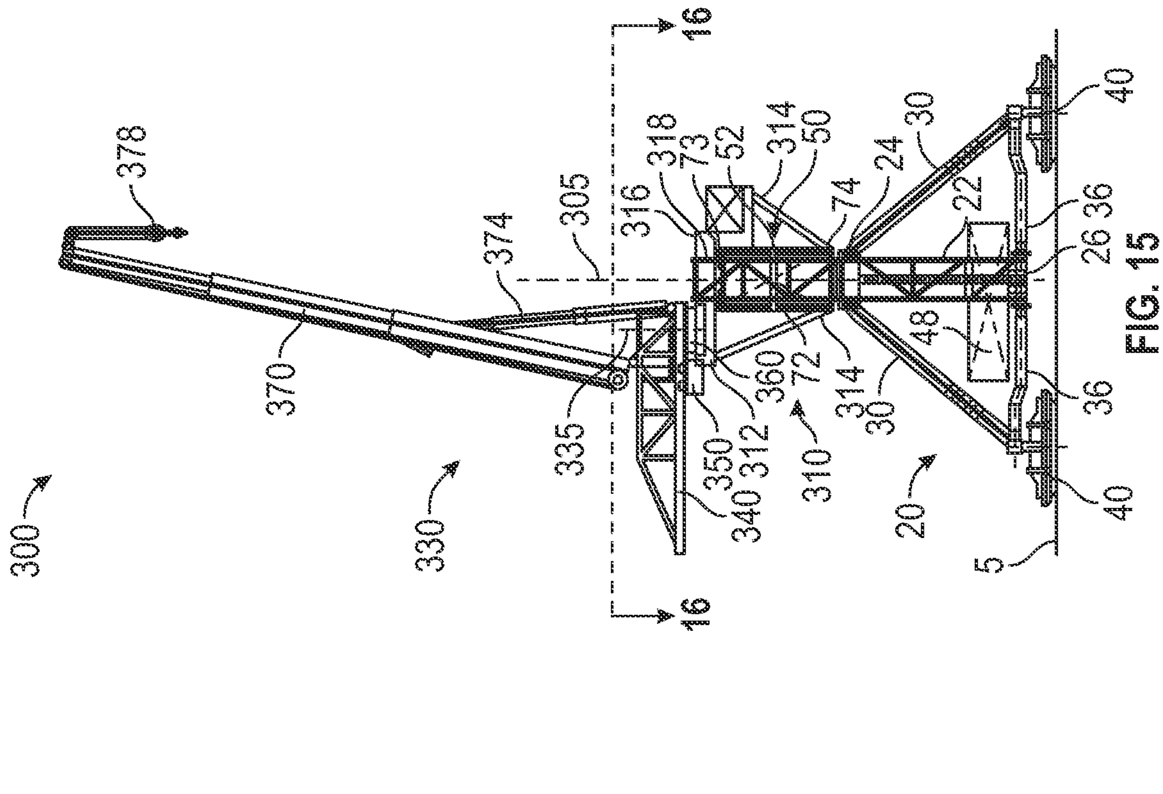
FIG. 15 is a front view of another embodiment of a tower crane.

The climbing assembly 310 includes the climbing frame 72 and the pair of latching assemblies 80 (not shown in FIGS. 15 and 16). Additionally, climbing assembly 310 includes a floor mount 312 supported on an upper end 73 of the climbing frame 72. In this exemplary embodiment, the floor mount 312 is additionally supported by a plurality of support braces 314 connected between the floor mount 312 and the lower end 74 of climbing frame 72. In this configuration, loads are transferred from the floor mount 312, though the climbing frame 72, and to the tower assembly 50. The floor mount 312 of climbing assembly 310 includes an upper support surface 316 defining an opening 318 aligned with central axis 305 of tower crane 300. The upper support surface 316 of floor mount 312 may be defined by one or more rails similar in configuration to the rails 114 of the crane floor 110 described previously.

In this exemplary embodiment, boom assembly 330 of tower crane 300 generally includes a transportable crane floor 340, a counterweight 350, a slew bearing 360, a luffing boom 370, one or more boom actuators 374, and a lifting member 378, such as a lifting hook. Luffing boom 370, boom actuators 374, and lifting member 378 may be configured similarly as the luffing boom 144, boom actuators 148, and lifting member 146 described previously. The slew bearing 360 of boom assembly 330 rotatably couples the crane floor 340 to the tower assembly 50 or floor mount 312 of climbing assembly 310. Particularly, slew bearing 360 permits crane floor 340 (and the equipment mounted to crane floor 340 including luffing boom 370) about a vertically extending rotational axis 335 that also defines a central or longitudinal axis of slew bearing 360.

Crane floor 340 (along with slew bearing 360) is shiftable between a first or working position, and a storage position spaced from the working position relative to the tower assembly 50. In other words, relative lateral movement between the crane floor 340 and the slew bearing 360 is restricted in this exemplary embodiment. Thus, unlike the crane floor 110 and slew bearing 210 described previously, crane floor 340 and slew bearing 360 translate in concert between the working position and the storage position. As will be described further, given that crane floor 340 moves in concert with slew bearing 360, crane floor 340 may be rotated about the rotational axis 335 even when crane floor 340 is in the storage position, permitting the luffing boom 370 to reach any piece of equipment positioned within a lifting radius of the luffing boom 370 based on the longitudinal length of the luffing boom 370. In this exemplary embodiment, the working and storage positions of crane floor 340 are laterally spaced. In some embodiments, in addition to being laterally spaced, the working and storage positions of crane floor 340 may also be vertically spaced.

In this exemplary embodiment, the slew bearing 360 of boom assembly 330 is connected to the floor support 312 of climbing assembly 310 via a pair of transport assemblies 345 (shown schematically in FIG. 16). Transport assemblies 345 may be configured similarly as the transport assemblies 250 and thus will not be described in detail herein. Additionally, slew bearing 360 is slidably supported on the upper support surface 316 of floor mount 312 such that loads from the crane floor 340 may be transferred through the slew bearing 360 to the climbing assembly 310 when the crane floor 340 is in the storage position.

Figure 18:
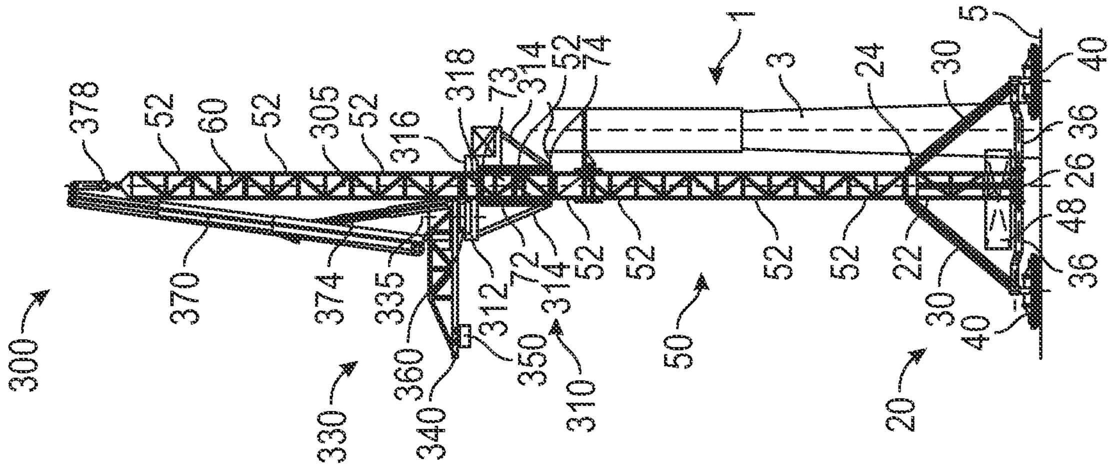
FIGS. 17-19 are additional front views of the tower crane of FIG. 15.
Figure 17:
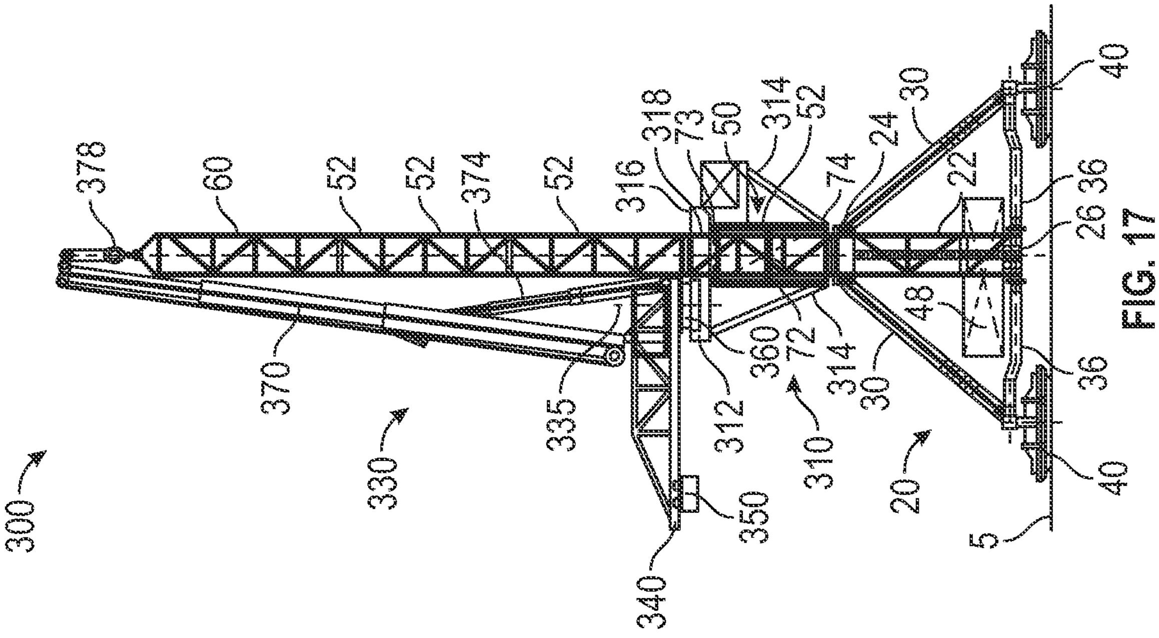
Figure 19:
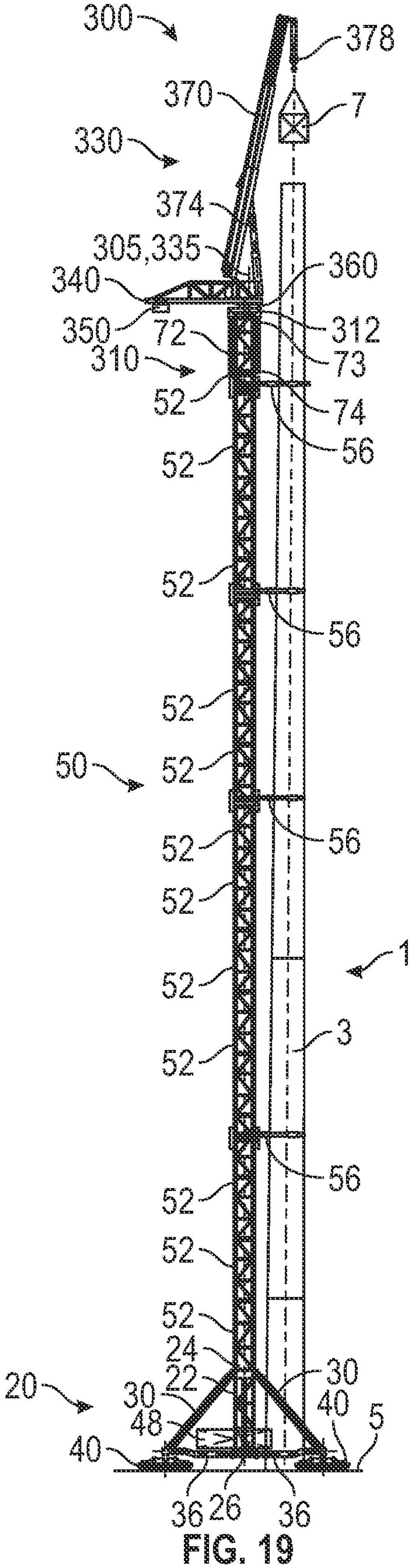

Referring briefly to FIGS. 17-19, an exemplary process for assembling the tower crane 300 is shown. Particularly, FIG. 17 illustrates tower crane 300 is shown top loading a tower unit 60 into the tower opening 318 of floor mount 312 with crane floor 340 in the storage position whereby an entirety of the crane floor 340 located to one side of the tower unit 60. A lower end of the tower unit 60 may be connected (via a plurality of threaded fasteners, for example) to the upper end of tower assembly 50 to thereby add tower unit 60 to the tower assembly 50. FIG. 18 illustrates the tower crane 300 after the boom assembly 330 and climbing assembly 310 have ascended the tower unit 60 recently added to the tower assembly 50 thereof. FIG. 19 illustrates the tower crane 300 in an extended configuration completing the assembly of wind turbine 1 by lowering the nacelle 7 atop the wind tower 3 of wind turbine 1.

Figure 20:
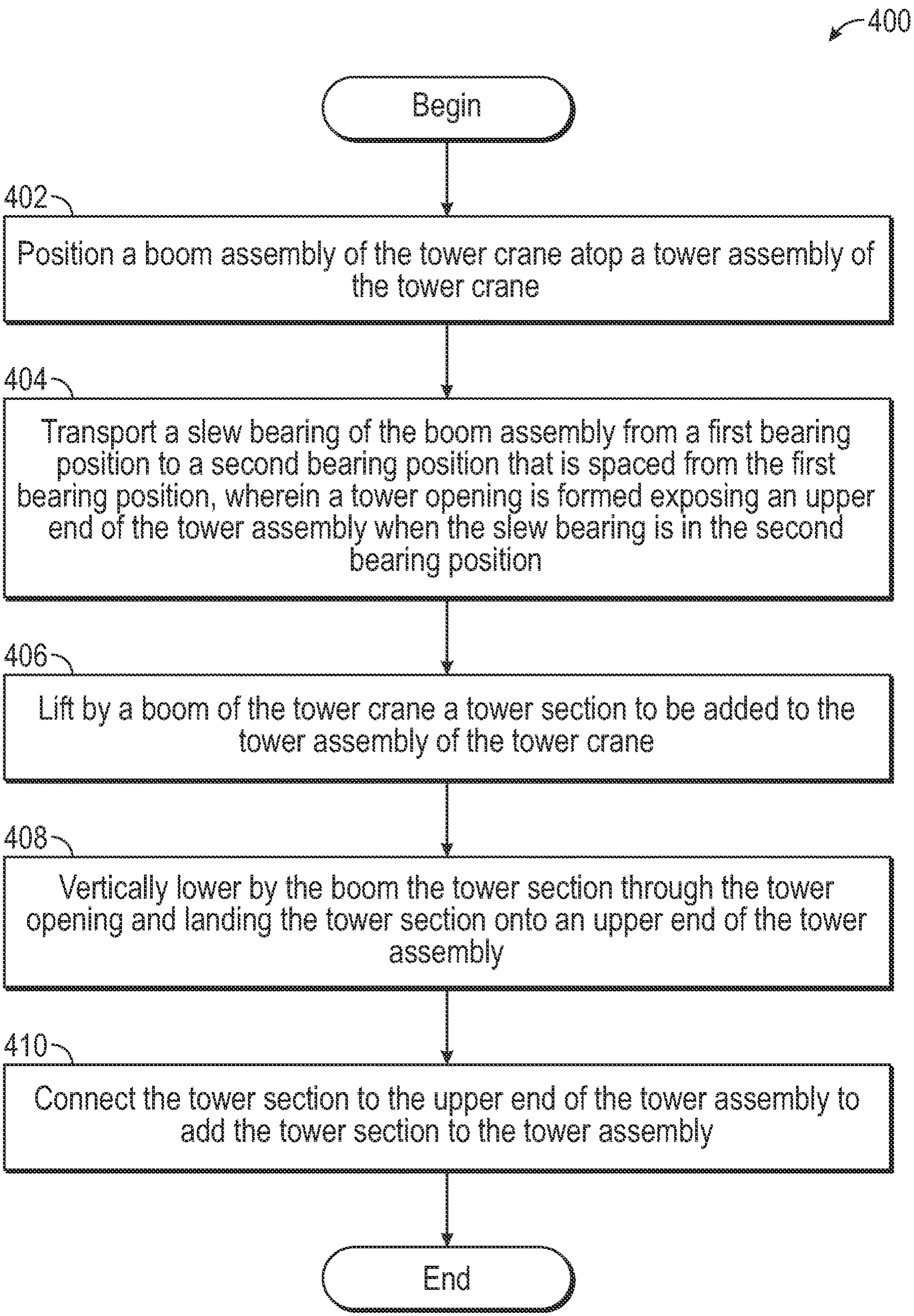
FIG. 20 is a flowchart of an embodiment of a method for lifting a load using a tower crane.

Referring to FIG. 20, an embodiment of a method 400 for lifting a load using a tower crane is shown. Beginning at block 402, method 400 comprises positioning a boom assembly of the tower crane atop a tower assembly of the tower crane. In some embodiments, block 402 comprises positioning the boom assembly 100 shown in FIG. 1 atop the tower assembly 50 also shown in FIG. 1. In other embodiments, block 402 comprises positioning the boom assembly 330 shown in FIG. 15 atop the tower assembly 50 also shown in FIG. 15.

At block 404, method 400 comprises transporting a slew bearing of the boom assembly from a first bearing position to a second bearing position that is spaced from the first bearing position, wherein a tower opening is formed exposing an upper end of the tower assembly when the slew bearing is in the second bearing position. In some embodiments, block 404 comprises transporting the slew bearing 210 from the first bearing position (with central axis 215 of slew bearing 210 aligned with the central axis 15 of tower assembly 50) to the second bearing position (with the central axis 215 of slew bearing 210 laterally offset from central axis 15) as shown particularly in FIGS. 1 and 2. In other embodiments, block 404 comprises transporting the slew bearing 360 (along with crane floor 340) from the first bearing position to the second bearing position as shown particularly in FIG. 15.

At block 406, method 400 comprises lifting by a boom of the tower crane a tower section to be added to the tower assembly of the tower crane. In some embodiments, block 406 comprises lifting a tower unit 60 of pre-connected tower sections 52 by the luffing boom 144 of tower crane 10 as shown particularly in FIGS. 2 and 3. In other embodiments, block 406 comprises lifting a tower unit 60 of pre-connected tower sections 52 by the luffing boom 370 of the tower crane 300 as shown particularly in FIG. 17.

At block 408, method 400 comprises vertically lowering the tower section through the tower opening and landing the tower section onto an upper end of the tower assembly. In some embodiments, block 408 comprises vertically lowering the tower unit 60 by the luffing boom 144 of tower crane 10 through the enclosed opening 112 formed by crane floor 110 onto an upper end of the tower assembly 50 as shown particularly by FIGS. 3 and 4. In other embodiments, block 408 comprises vertically lowering the tower unit 60 by the luffing boom 370 of tower crane 300 through the opening 318 onto the upper end of tower assembly 50 as shown particularly by FIGS. 17 and 18.

At block 410, method 400 comprises connecting the tower section to the upper end of the tower assembly to add the tower section to the tower assembly. In some embodiments, block 410 comprises connecting the tower unit 60 to the upper end of the tower assembly 50 of either the tower crane 10 or the tower crane 300 as shown particularly by FIGS. 4 and 5, and FIGS. 18 and 19, respectively.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A tower crane for performing a lifting a load, the tower crane comprising:

an extendable tower assembly having a central axis and comprising a plurality of separate tower sections;

a climbing assembly comprising a climbing frame positioned on the tower assembly and a latching assembly to transport the climbing assembly vertically along the tower assembly; and a boom assembly atop the tower assembly and comprising a crane floor, a boom supported on the crane floor, a lifting member coupled to the boom, a slew bearing coupled to the crane floor and configured to permit the crane floor to rotate about a rotational axis, and a transport actuator separate from the lifting member and coupled to the slew bearing; and wherein the slew bearing is translatable by the transport actuator between a first bearing position and a second bearing position spaced from the first bearing position relative to the central axis of the tower assembly.

2. The tower crane of claim 1, wherein the rotational axis is aligned with the central axis of the tower assembly when the slew bearing is in the first bearing position, and wherein the rotational axis is laterally spaced from the central axis of the tower assembly when the slew bearing is in the second bearing position.

3. The tower crane of claim 1, wherein the slew bearing comprises an upper support connected to the crane floor, an annular first bearing race connected to the upper support, a lower support connected to the tower assembly when the slew bearing is in the first bearing position, and an annular second bearing race connected to the lower support and rotatable about the rotational axis relative to the first bearing race.

4. The tower crane of claim 3, wherein the lower support of the slew bearing is disconnected from the tower assembly when the slew bearing is in the second bearing position.

5. The tower crane of claim 1, wherein a lower end of the crane floor is attached to the climbing frame of the climbing assembly when the slew bearing is in the second bearing position.

6. The tower crane of claim 1, wherein:

the climbing frame comprises a floor support on which the crane floor and the slew bearing are positioned; and with the boom assembly positioned atop the tower assembly, the crane floor comprises a first floor position and a second floor position spaced from the first floor position relative to the central axis of the tower assembly.

7. The tower crane of claim 6, wherein the crane floor is rotatable about the rotational axis when the crane floor is in both the first floor position and the second floor position.

8. A tower crane for performing a lifting a load, the tower crane comprising:

an extendable tower assembly having a central axis and comprising a plurality of separate tower sections;

a climbing assembly comprising a climbing frame positioned on the tower assembly and a latching assembly to transport the climbing assembly vertically along the tower assembly; and a boom assembly positioned atop the tower assembly and comprising a crane floor, a boom supported on the crane floor, a lifting member coupled to the boom, a slew bearing coupled to the crane floor and configured to permit the crane floor to rotate about a rotational axis, and a slew bearing transport assembly supported on the crane floor and configured to transport the slew bearing rectilinearly along a transport axis that extends orthogonal the central axis between a first bearing position along the transport axis and a second bearing position along the transport axis that is spaced from the first bearing position.

9. The tower crane of claim 8, wherein the slew bearing transport assembly comprises a transport frame transportable along the crane floor, a transport actuator connected between the transport frame and the slew bearing, and a latching actuator configured to selectably lock the transport frame to the crane floor.

10. The tower crane of claim 9, wherein the slew bearing transport assembly comprises a slew latch comprising a locked position received in a notch formed in the crane floor preventing relative lateral movement between the transport frame and the crane floor, and an unlocked position retracted from the notch and permitting relative lateral movement between the transport frame and the crane floor.

11. The tower crane of claim 9, wherein the transport actuator is configured to displace the slew bearing laterally relative to the central axis of the tower assembly in response to actuating the transport actuator between an extended configuration and a retracted configuration.

12. The tower crane of claim 8, wherein the rotational axis is aligned with the central axis of the tower assembly when the slew bearing is in the first bearing position, and wherein the rotational axis is spaced from the central axis of the tower assembly when the slew bearing is in the second bearing position.

13. The tower crane of claim 8, wherein:

the climbing frame comprises a floor support on which the crane floor and the slew bearing are positioned; and with the boom assembly positioned atop the tower assembly, the crane floor comprises a first floor position and a second floor position spaced from the first floor position relative to the central axis of the tower assembly.

14. The tower crane of claim 8, wherein the slew bearing comprises an upper support connected to the crane floor, an annular first bearing race connected to the upper support, a lower support connected to the tower assembly when the slew bearing is in the first bearing position, and an annular second bearing race connected to the lower support and rotatable about the rotational axis relative to the first bearing race.

15. The tower crane of claim 14, wherein the lower support of the slew bearing is disconnected from the tower assembly when the slew bearing is in the second bearing position.

16. A method for lifting a load using a tower crane, the method comprising:

(a) positioning a boom assembly of the tower crane atop a tower assembly of the tower crane;

(b) transporting by a transport actuator a slew bearing of the boom assembly from a first bearing position to a second bearing position that is spaced from the first bearing position, wherein a tower opening is formed exposing an upper end of the tower assembly when the slew bearing is in the second bearing position;

(c) lifting by lifting member of a boom of the tower crane a tower section to be added to the tower assembly of the tower crane, wherein the lifting member is separate from the transport actuator;

(d) vertically lowering by the boom the tower section through the tower opening and landing the tower section onto an upper end of the tower assembly; and (e) connecting the tower section to the upper end of the tower assembly to add the tower section to the tower assembly.

17. The method of claim 16, wherein (a) comprises actuating a transport assembly connected between the slew bearing and a crane floor of the tower crane to transport the slew bearing between the first bearing position and the second bearing position.

18. The method of claim 17, wherein (b) comprises:

(b1) actuating a slew latch of the transport assembly from an unlocked position to a locked position received in a notch formed in the crane floor; and (b2) actuating a transport actuator of the transport assembly to displace the slew bearing laterally along the crane floor with the slew latch in the locked position.

19. The method of claim 16, further comprising:

(f) transporting a crane floor of the tower crane from a first floor position to a second floor position, wherein a tower opening is formed exposing an upper end of the tower assembly when the slew bearing is in the second bearing position.

* * * * *